(12) United States Patent
Ito et al.

(10) Patent No.: US 7,990,499 B2
(45) Date of Patent: Aug. 2, 2011

(54) DISPLAY DEVICE

(75) Inventors: Akiko Ito, Uji (JP); Kozo Nakamura, Kashiba (JP); Shun Ueki, Nara (JP); Tokio Taguchi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 144 days.

(21) Appl. No.: 12/280,729

(22) PCT Filed: Dec. 28, 2006

(86) PCT No.: PCT/JP2006/326273
§ 371 (c)(1),
(2), (4) Date: Aug. 26, 2008

(87) PCT Pub. No.: WO2007/108195
PCT Pub. Date: Sep. 27, 2007

(65) Prior Publication Data
US 2009/0015770 A1    Jan. 15, 2009

(30) Foreign Application Priority Data
Mar. 20, 2006    (JP) .................................. 2006-077733

(51) Int. Cl.
*G02F 1/1335* (2006.01)
(52) U.S. Cl. ......................................... 349/108; 349/109
(58) Field of Classification Search .................. 349/108, 349/109
See application file for complete search history.

(56) References Cited

U.S. PATENT DOCUMENTS
5,680,185 A * 10/1997 Kobayashi et al. ............. 349/88
5,899,550 A    5/1999 Masaki
6,049,364 A * 4/2000 Takahara et al. ................ 349/10
6,218,679 B1 * 4/2001 Takahara et al. ................ 257/59
6,738,204 B1    5/2004 Chuang et al.
7,067,985 B2 * 6/2006 Adachi ....................... 315/169.3
7,163,739 B2 * 1/2007 Koike et al. .................... 428/343
7,248,314 B2   7/2007 Yun
7,425,794 B2 * 9/2008 Adachi .......................... 313/112

(Continued)

FOREIGN PATENT DOCUMENTS
CN    1492263 A    4/2004
(Continued)

OTHER PUBLICATIONS
International Search Report for PCT/JP2006/326273 mailed Feb. 13, 2007.
(Continued)

*Primary Examiner* — K. Cyrus Kianni
(74) *Attorney, Agent, or Firm* — Nixon & Vanderhye P.C.

(57) ABSTRACT

The present invention provides a transflective display device capable of reducing a difference in white balance between transmissive display and reflective display. The display device of the present invention is a transflective display device including three or more filters having different colors in a pixel, each of the three or more filters having different colors, including: a transmissive region for displaying an image by transmitting light from a backlight; and a reflective region for displaying an image by reflecting surrounding light, wherein, in the reflective region of at least one of a plurality of filters having different colors used for displaying white in reflective display, a light-reducing film which reduces an amount of at least light having a peak wavelength of a visible light transmission spectrum of the at least one of a plurality of filters is arranged, and the visible light transmission spectrum is measured using a standard light source $D_{65}$.

18 Claims, 10 Drawing Sheets

U.S. PATENT DOCUMENTS

| | | |
|---|---|---|
| 7,463,319 B2 | 12/2008 | Roh |
| 7,557,494 B2 * | 7/2009 | Adachi .................. 313/112 |
| 7,573,551 B2 * | 8/2009 | Koma et al. .................. 349/114 |
| 7,732,809 B2 * | 6/2010 | Adachi et al. .................. 257/40 |
| 2003/0176124 A1 * | 9/2003 | Koike et al. .................. 442/16 |
| 2004/0027672 A1 * | 2/2004 | Bourdelais et al. .......... 359/586 |
| 2004/0246414 A1 | 12/2004 | Iijima et al. |
| 2005/0035353 A1 * | 2/2005 | Adachi et al. .................. 257/72 |
| 2005/0083453 A1 | 4/2005 | Nakano et al. |
| 2005/0123243 A1 * | 6/2005 | Steckl et al. .................. 385/40 |
| 2005/0190323 A1 | 9/2005 | Iijima |
| 2005/0237450 A1 | 10/2005 | Hu et al. |
| 2005/0237451 A1 | 10/2005 | Maeda et al. |
| 2005/0275769 A1 | 12/2005 | Roh et al. |
| 2006/0028146 A1 * | 2/2006 | Adachi .................. 315/169.3 |
| 2007/0071970 A1 * | 3/2007 | Koike et al. .................. 428/343 |
| 2008/0007155 A1 * | 1/2008 | Adachi .................. 313/498 |
| 2008/0068552 A1 | 3/2008 | Hu et al. |
| 2008/0174727 A1 | 7/2008 | Iijima |
| 2009/0072731 A1 * | 3/2009 | Adachi .................. 313/504 |
| 2010/0072880 A1 * | 3/2010 | Adachi et al. .................. 313/498 |

FOREIGN PATENT DOCUMENTS

| | | |
|---|---|---|
| CN | 1539128 A | 10/2004 |
| JP | 4-12323 | 1/1992 |
| JP | 2001-209047 | 8/2001 |
| JP | 2002-365420 | 12/2002 |
| JP | 2003-302516 | 10/2003 |
| JP | 2005-107513 | 4/2005 |
| JP | 2005-227753 | 8/2005 |
| JP | 2005-309306 | 11/2005 |
| JP | 2005-316416 | 11/2005 |
| WO | 02/101644 A2 | 12/2002 |

OTHER PUBLICATIONS

CN Office Action and English translation thereof mailed Sep. 25, 2009 in corresponding Chinese application 2006800535594.

U.S. Appl. No. 12/280,878, filed Aug. 27, 2008, Taguchi et al.

Chinese Office Action and English translation thereof mailed Mar. 11, 2010 in corresponding Chinese application 200780009916.1.

International Search Report for PCT/JP2007/051816 mailed May 1, 2007.

JP Office Action dated Mar. 15, 2011 w/English translation.

* cited by examiner (a)

(b)

(a)

(b)

(a)

(b)

(a)

(b)

DISPLAY DEVICE

This application is the U.S. national phase of International Application No. PCT/JP2006/326273 filed 28 Dec. 2006 which designated the U.S. and claims priority to Japanese Patent Application No. JP 2006-077733 filed 20 Mar. 2006, the entire contents of each of which are hereby incorporated by reference.

TECHNICAL FIELD

The present invention relates to a display device. More specifically, the present invention relates to a transflective display device which displays images in both of a transmissive region and a reflective region.

BACKGROUND ART

Currently, liquid crystal display devices are used widely in electronic apparatuses such as a monitor, a projector, a mobile phone and a Personal Digital Assistant (hereinafter, also referred to as a "PDA") Such liquid crystal display devices are classified into reflective, transmissive, and transflective (semi-transmissive) types. The reflective liquid crystal display device is configured to obtain display light by guiding surrounding light to the inside of a liquid crystal display panel and reflecting this light by a reflective member. Furthermore, the transmissive liquid crystal display device is configured to obtain display light by guiding light from a light source (hereinafter, also referred to as a "backlight") arranged on the back surface side of a liquid crystal display panel and emitting the light to the outside through the panel.

According to the transflective liquid crystal display device, transmissive display using light from the backlight is mainly observed under relatively dark environments such as indoor environment. Under relatively bright environments such as outdoor environment, reflective display using surrounding light is mainly observed. As a result, the transflective liquid crystal display device can perform display with a high contrast ratio regardless of surrounding brightness. That is, the transflective liquid crystal display device can perform display under all environments regardless of indoor and outdoor environments, and therefore such a device has been often equipped with mobile devices such as a cellular phone, a PDA, and a digital camera.

According to such a transflective liquid crystal display device, the liquid crystal panel has two different display regions: a reflective region; and a transmissive region. In the transmissive region, light from the backlight passes through a liquid crystal layer and a color filter only one time and then the light is emitted to the outside. In the reflective region, surrounding light passes through the color filter and the liquid crystal layer, and the light is reflected by a reflective member and further passes through the liquid crystal layer and the color filter again. Then, the light is emitted to the outside. Thus, the transmissive region and the reflective region use different light sources, that is, backlight and surrounding light, thereby generating display light. In addition, a color reproduction range in the transmissive display is obtained by causing light to enter the color filter only one time. A color reproduction range in the reflective display is obtained by causing light to enter the color filter twice.

A color filter used in a conventional liquid crystal display device is composed of filters having three primary colors of red, green, and blue. A color of light emitted from each color filter is expressed by additive color mixture of three primary colors of red, green, and blue. However, by using only these three primary colors, the color reproduction range is limited. Therefore, not all colors which can be recognized by human eyes can be expressed. Four or more color filters having different colors have been proposed in order to extend the color reproduction range and improve use efficiency of light. For example, the Patent Document 1 discloses a color filter including four colors consisting of yellow in addition to the three primary colors of red, green, and blue (hereinafter, also referred to as "four filters having different colors"). With respect to these four colors, blue and yellow are in a complementary color relationship, and red and green, and blue and yellow are pairs of opposite colors based on human visual characteristics.

White balance is mentioned as one of important display performances of the display device. This white balance is a color tone of white displayed by a display device, and mainly determined by a color tone of a light source and a configuration of a color filter. This white balance is often expressed as a color temperature (an absolute temperature of a black body having the same or almost the same chromaticity as a chromaticity of a certain light) quantitatively, and generally, a display for displaying TV images and the like needs a color temperature of 6500 K or more.

If the four filters having different colors are used as the color filter of the liquid crystal display device, the color reproduction range can be extended or the luminance can be improved. However, the white balance is significantly affected. For example, in a liquid crystal display device including a light source which corresponds spectral characteristics of filters having three primary colors, if four filters having different colors are used instead of the filters having three primary colors, the color temperature of the color filter is reduced, and thereby the white balance is shifted and white displayed by the display device becomes yellowish white.

The white balance in the transmissive display can be improved by adjusting the color tone of the light source in the backlight because the backlight is used as the light source. In the reflective display using surrounding light as the light source, however, it is difficult to improve the white balance by way of the light source. Even if the white balance in the transmissive display is improved, a large difference in white balance is generated between the transmissive display and the reflective display.

A method of previously adjusting the configuration of the four filters having different colors, thereby obtaining an optimal white balance in the reflective display, is mentioned. For example, a method of extremely decreasing the thickness of the blue filter, thereby increasing contribution of blue that is a complementary color of yellow, is mentioned. However, even if the thickness of the blue filter is reduced, white free from a yellow tinge is not obtained. Further, if such a design modification is performed, a color purity of blue is reduced. As a result, a large difference is generated between a display color and a color obtained using the three filters having different colors in accordance with NTSC (National Television System Committee) standard.

[Patent Document 1]
Japanese Kokai Publication No. 2001-209047

DISCLOSURE OF INVENTION

The present invention has been made in view of the above-mentioned state of the art. The present invention has an object to provide a transflective display device capable of reducing a difference in white balance between the transmissive display and the reflective display.

The present inventors made various investigations on a transflective display device including three or more filters having different colors in a pixel, each of the three or more filters having different colors including: a transmissive region for displaying an image by transmitting light from a backlight; and a reflective region for displaying an image by reflecting surrounding light. The inventors noted white balance of the transmissive display and the reflective display. Then, the inventors found the followings. With regard to the transmissive display, the white balance can be optimized by adjusting the color tone of the light source in the backlight. However, with regard to the reflective display, surrounding light is used as the light source and therefore, the white balance can not be optimized by this method. Therefore, white with a tinge of some kind of color is displayed. Then, the inventors found the followings. If, in the reflective region of at least one of a plurality of filters having different colors used for displaying white in the reflective display, a film (also referred to as a "light-reducing film") which reduces an amount of at least light having a wavelength corresponding to a peak wavelength of a visible light transmission spectrum measured using a standard light source $D_{65}$, of the at least one of a plurality of filters, is arranged, the quantity or tinge of some kind of color of light which passes through the at least one of a plurality of filters can be adjusted, and therefore the white balance in the reflective display can be adjusted. Thus, the inventors found that the difference in white balance between the transmissive display and the reflective display can be reduced. Thereby, the above-mentioned problems have been admirably solved, leading to completion of the present invention.

That is, the present invention relates to a transflective display device including three or more filters having different colors in a pixel, each of the three or more filters having different colors, including: a transmissive region for displaying an image by transmitting light from a backlight; and a reflective region for displaying an image by reflecting surrounding light, wherein, in the reflective region of at least one of a plurality of filters having different colors used for displaying white in reflective display, a light-reducing film which reduces an amount of at least light having a peak wavelength of a visible light transmission spectrum of the at least one of a plurality of filters is arranged, and the visible light transmission spectrum is measured using a standard light source $D_{65}$.

The present invention is mentioned below in more detail.

According to the display device of the present invention, three or more filters having different colors are arranged in a pixel. In the present description, the "three or more filters having different colors" means that three or more filters which differ in at least hue (kind of color) among the three attributes. The filter means a filter which selectively transmits visible light within a specific wavelength range more than visible light in other wavelength ranges. A film which has a uniform transmittance at each wavelength of visible light (a so-called achromatic film) is not included as the filter. The material for the filter is not especially limited. Examples thereof include a resin stained by a dye, a resin into which a pigment is dispersed, and a material obtained by solidifying a fluid material (ink) into which a pigment is dispersed. The method of forming the filter is not especially limited. Examples thereof include a dyeing method, a pigment dispersion method, an electrodeposition method, a printing method, an ink-jet method, and a dry film laminate (DFL) method. In the present description, the pixel means the minimum unit for displaying an image. The pixel is generally composed of sub-pixels in each filter region. Therefore, the pixel in accordance with the display device of the present invention is composed of sub-pixels having three or more colors. In the present invention, all of the filters arranged in one pixel are collectively called color filter.

The array pattern of the above-mentioned filters is not especially limited. Examples thereof include a stripe pattern, a delta pattern, and a mosaic pattern. The configuration of the filters is not especially limited. For example, if the filters are arrayed in a stripe pattern, filters having the same color are formed together between pixels which are adjacently arranged in the same column (vertical direction). In the present description, the "filter" generally means a filter included in one pixel regardless of the configuration. The number of the filters which are arranged in one pixel is not especially limited. A plurality of filters having the same color may be arranged in one pixel, but it is referable that a plurality of filters having different colors are arranged in one pixel in terms of resolution or signal analysis.

Between the above-mentioned filters (between the sub-pixels and between the pixels), it is preferable that a shielding member such as black matrix (BM) is arranged in order to prevent light leakage between the filters. If the filters are formed by an ink-jet method, a printing method, and the like, a bank (projective structure, wall for preventing color mixing) may be disposed between the filters to prevent mixing of inks having different colors. If the bank has no shielding property, it is preferable that a shielding member is further arranged between the filters.

In the present description, the shielding member means a member for substantially completely shielding visible light. Specifically, the shielding member means a member which has a transmittance of less than 0.1 (optical concentration D>3) and a luminous reflectance $Y \leq 5$ at the entire visible wavelength of 400 to 700 nm. It is preferable that the reflectance of the shielding member is 5% or less at the entire visible wavelength of 400 to 700 nm. The material for the shielding member is not especially limited. Chromium, chrome oxide, acrylic resin (e.g. photosensitive resin) into which black pigment is dispersed, and the like, are mentioned. However, the acrylic resin into which black pigment is dispersed is preferable in terms of environment. The black pigment is not especially limited, and carbon fine particles, chromium or titanium black pigment, and the like, may be mentioned. As a method of forming the shielding member, the same method as the method of forming the filter may be mentioned although depending on the material for the shielding member. The configuration of the shielding member is not especially limited as long as the entire shielding member has the above-mentioned optical characteristics. For example, a BM composed of stacked filters having different colors may be mentioned.

The color combination in the above-mentioned three or more filters having different colors is not especially limited. However, it is preferable that at least three primary colors of red, green, and blue are included in order to reproduce a color equal to a color in accordance with NTSC standard. Further, in order to effectively extend the color reproduction range, it is preferable that yellow, cyan, and magenta, i.e., complementary colors of the three primary colors, are included in addition to red, green, and blue. In the present description, the red is a hue having a dominant wavelength of 597 nm or more and 780 nm or less in an xy chromaticity diagram in an XYZ color system (CIE 1931 standard colorimetric system), and preferably 600 nm or more and 620 nm or less. The yellow is a hue having a dominant wavelength of 558 nm or more and less than 597 nm, and preferably 570 nm or more and 582 nm or less. The green is a hue having a dominant wavelength of 510 nm or more and less than 558 nm, and preferably 520 nm or more and 557 nm or less. The cyan is a hue having a dominant wavelength of 488 nm or more and less than 510 nm, and preferably 493 nm or more and 503 nm or less, The blue is a hue having a dominant wavelength of 380 nm or more and less than 488 nm, and preferably 455 nm or more and 475 nm or less. The magenta is a hue having a complementary dominant wavelength of 495 nm or more and less than 565 nm, and preferably 502 nm or more and 558 nm or less. With regard to the color purity in the reflective region of the three or more filters having different colors, it is preferable that the NTSC ratio in the xy chromaticity diagram in the XYZ color system is 20% or more.

The display device of the present invention generally includes a liquid crystal display panel in which a light crystal layer is imposed between a TFT array substrate and a counter substrate. The above-mentioned three or more filters having different colors are generally arranged on the counter substrate side. However, according to this configuration, if the TFT substrate and the counter substrate are misaligned and attached, the aperture ratio is reduced. Therefore, in order to prevent such a reduction in aperture ratio, the filters may be arranged on the TFT array substrate side (CF on Array). Alternatively, the TFT array may be arranged on the filters (TFT on CF). Similarly to the three or more filters having different colors, the shielding member such as a BM is generally arranged on the counter substrate side. However, it may be arranged on the TFT array substrate side (BM on Array).

The display device of the present invention includes, in each filter, a transmissive region for displaying an image by transmitting light from a backlight and a reflective region for displaying an image by reflecting surrounding light. That is, the display device of the present invention is a transflective (semi-transmissive) display device, and therefore it can perform both of transmissive display for displaying an image by transmitting light from a backlight and reflective display for displaying an image by reflecting surrounding light. According to the display device of the present invention, the three or more filters having different colors are arranged in both of the transmissive region and the reflective region. Therefore, in both of the transmissive display and the reflective display, the color reproduction range can be extended. If four or more filters having different colors are arranged in both of the transmissive region and the reflective region, the color reproduction range can be effectively extended in both of the transmissive display and the reflective display.

The above-mentioned transmissive region means a region used for transmissive display, and generally means a region where a transparent conductive member for applying a voltage to the liquid crystal layer is formed on each of the TFT array substrate and the counter substrate constituting the liquid crystal display panel. The transparent conductive member on the TFT array substrate side is generally formed in each filter (sub-pixel) region, that is, over the entire region of the transmissive region and the reflective region of the filter. The transparent conductive member on the counter substrate side is generally formed as an electrode common to every pixel. The material for the transparent conductive member is not especially limited, and indium tin oxide (ITO) and the like are mentioned. The backlight is not especially limited, and a direct or edge type one may be used. The light source in the backlight is not especially limited, but a light source which has a light emission spectrum corresponding to the spectral characteristics of the filters is preferable in order to optimize the white balance in the transmissive display. For example, a light emitting diode (LED), a cold cathode fluorescent tube (CCFT), a hot cathode fluorescent tube (HCFT), and the like, may be used.

The above-mentioned reflective region means a region used for reflective display, and generally means a region where a reflective member is formed on the TFT array substrate side constituting the liquid crystal panel and a transparent conductive member is formed on the counter substrate side. In the present description, the reflective member substantially completely reflects visible light and specifically has a reflectance of 70% or more in the entire visible light wavelength of 400 to 700 nm. The reflectance of the reflective member is preferably 80% or more at the entire visible light wavelength of 400 to 700 nm. The material for the reflective member is not especially limited. Aluminum, silver, an alloy of these metals, and the like, may be mentioned. An aluminum, chromium, tungsten, and the like, which has a broad reflectance at the entire visible light wavelength, are preferably used. The reflective member may have a function as an electrode for applying a voltage to the liquid crystal layer. The reflective member is also referred to as a reflective electrode if it functions as an electrode. If the reflective member does not function as an electrode, it is preferable that an electrode is additionally arranged in the reflective region. The transparent conductive member serves as the reflective electrode, generally. The reflective member may be processed to have an uneven surface, thereby being provided with a light-scattering property in order to improve the use efficiency of light, or may have a mirror surface. It is preferable that a light-scattering layer is additionally arranged if the reflective member has a mirror surface. The light-scattering layer may be used additionally even if the reflective member has the light-scattering property.

In the above-mentioned reflective region, a projective member (hereinafter, also referred to as a "multi-gap layer") is formed to make the thickness of the liquid crystal layer in the reflective region smaller than the thickness of the liquid crystal layer in the transmissive region. The multi-gap layer may be arranged on the TFT array substrate side or the counter substrate side. It is preferable that the multi-gap layer is arranged on the counter substrate side in order to increase the aperture ratio. The material for the multi-gap layer is not especially limited. If the multi-gap layer is arranged on the observation surface side relative to the reflective member, the optical characteristics of the multi-gap layer have an influence on display qualities of the reflective display. Therefore, it is preferable that the material for the multi-gap layer is appropriately selected. It is preferable that the thickness of the multi-gap layer is substantially half the thickness of the liquid crystal layer in the transmissive region (hereinafter, also referred to as a "cell thickness"), in order to uniform an optical path length in the reflective region and an optical path length in the transmissive region.

The display device of the present invention may includes a so-called front light and use it for reflective display, together with surrounding light.

According to the display device of the present invention, in the reflective region of at least one of a plurality of filters having different colors used for displaying white in reflective display, a light-reducing film which reduces an amount of at least light having a peak wavelength of a visible light transmission spectrum of the at least one of a plurality of filters, measured using a standard light source $D_{65}$, is arranged. According to this, in the reflective region of at least one of a plurality of filters having different colors used for displaying white in reflective display, at least light having a wavelength corresponding to a peak wavelength of the visible light transmission spectrum of the at least one of a plurality of filters, of light which has passed the at least one of a plurality of filters, is reduced when the light passes through the light-reducing film. Thus, the amount or tinge of some kind of color of the light which passes through the filter can be adjusted. Accordingly, the light-reducing film which corresponds to the spectral characteristics of the filter is arranged in the reflective region of the filter, and as a result, the white balance in the reflective display can be optimized. The white balance in the transmissive display can be optimized by, for example, adjusting a color temperature of the light source in the backlight or a cell thickness in the transmissive region. Therefore, the difference in white balance between the transmissive display and the reflective display can be reduced.

In order to achieve the object of the present invention, it is preferable that the filter on which the light-reducing film is arranged includes, among the plurality of filters having different colors used for displaying white in reflective display, a filter having the same hue as a tinge which white has when a display device including no light-reducing film displays white in the reflective display. For example, if yellowish white is displayed when the display device displays white in the reflective display using the yellow and green filters arranged in the pixel, it is preferable that the light-reducing film is arranged in the reflective region of at least yellow filter. And if greenish white is displayed, it is preferable that the light-reducing film is arranged in the reflective region of at least green filter. If the light-reducing film is arranged in the reflective region of a filter having the same hue as the tinge which white has, the light-reducing film may be arranged also in the reflective region of a filter having a hue different from such a tinge.

In the present description, the standard light source $D_{65}$ means a light source capable of emitting standard light $D_{65}$ approximately. For example, a xenon lamp may be used. The visible light transmission spectrum means a transmission spectrum at the entire visible wavelength of 400 to 700 nm. The peak wavelength means a wavelength at which the transmittance is the maximum in the visible light transmission spectrum. The light reduction means a phenomenon in which light energy is decreased and it generally means absorption by a medium of the filter, or one caused by absorption and scattering by the medium of the filter.

It is preferable that the transmittance of the above-mentioned light-reducing film is 0.1% or more and 90% or less if the light-reducing film is an achromatic film. If the light-reducing film is a blue film, it is preferable that the light-reducing film hardly overlaps the visible light transmission spectrum of the filter on which the light-reducing filter is arranged and has a transmittance of 50% or more in order for the light-reducing film to largely change the dominant wavelength of transmissive light.

The above-mentioned light-reducing film may be arranged at least in a part of the reflective region of the filter of at least one color, but generally arranged on the entire reflective region of the filter of at least one color. If the light-reducing film is arranged in a part of the reflective region of the filter of at least one color, the position where the light-reducing film is arranged is not especially limited as long as the light-reducing film is arranged in the reflective region of the filter of at least one color. The order of stacking the light-reducing film and the filter is not especially limited. That is, the positional relationship between the light-reducing film and the filter in the normal direction on the observation surface of the display device is not especially limited as long as the light-reducing film and the filter are arranged on the observation surface side relative to the reflective member. The light-reducing film may be arranged on the observation surface side relative to the filter or on the back surface side relative to the filter. The light-reducing film and the filter may or may not be in contact with each other.

The display device of the present invention is not especially limited as long as it has the above-mentioned configuration. The display device may or may not have other components. The display device of the present invention may or may not use all of the filters in the pixel when white is displayed in the reflective display. The display device of the present invention may or may not use all of the filters in the pixel when white transmissive display is performed. Further, the plurality of filters having different colors used for displaying white in the reflective display and the plurality of filters having different colors used for displaying white in the transmissive display may be the same or different pairs.

Preferable embodiments in the display device of the present invention are mentioned in more detail below.

It is preferable that the light-reducing film has a hue different from a hue of the filter on which the light-reducing film is arranged, and the display device emits light having the same hue as the hue of the filter on which the light-reducing film is arranged from the reflective region of the filter on which the light-reducing film is arranged when the display device displays white in the reflective display using the standard light source $D_{65}$. According to this, the light-reducing film can reduce light while maintaining the hue of incident light. Therefore, the white balance in the reflective display can be effectively optimized. In order to achieve the object of the present invention more effectively, it is preferable that when the reflective display is performed using the standard light source $D_{65}$, light emitted from the reflective region of the filter on which the light-reducing film is arranged has a dominant wavelength different from that of light emitted from the filter by 38 nm or less.

It is preferable that a red filter, a green filter, a blue filter, and a yellow filter are arranged in the pixel and the light-reducing film is a blue-colored film. Thus, if the yellow filter is additionally used together with the filters with the three primary colors of red, green, and blue, the NTSC standard ratio is secured, and simultaneously the color reproduction range can be extended and the luminance can be improved more effectively in both of the transmissive display and the reflective display in comparison to the case where the filters with the three primary colors of red, green, and blue are used.

It is preferable that the light-reducing film is arranged in the reflective region of the yellow filter. According to a display device in which red, green, blue, and yellow filters are arranged in a pixel without the light-reducing film, if the red, green, blue, and yellow filters arranged in the pixel are used, yellowish white is displayed when white is displayed in the reflective display. According to a display device in which red, green, blue, and yellow filters are arranged in a pixel with the light-reducing film, the white balance in the reflective display can be optimized by reducing yellow light which has passed through the yellow filter. Further, the white balance in the transmissive display can be optimized by adjusting the color temperature of the light source of the backlight or the cell thickness, and the like. Therefore, a difference in the white balance between the transmissive display and the reflective display can be reduced. Further, not only the white balance in the reflective display but also luminance or color reproduction range in the reflective display can be adjusted by adjusting the optical characteristics of the reflective member or the light-reducing film constituting the reflective region of the yellow filter.

It is preferable that the display device emits yellow light from the reflective region of the yellow filter on which the light-reducing film is arranged when the display device displays white in the reflective display using the standard light source $D_{65}$. According to this, the light-reducing film can reduce light while maintaining the hue of incident yellow light. Therefore, the white balance in the reflective display can be effectively optimized.

It is preferable that the light-reducing film is a gray film. The gray film can reduce incident light at almost a certain ratio at the entire visible wavelength of 400 to 700 nm. That is, the gray film can reduce light while maintaining the hue of incident light. Therefore, the white balance in the reflective display can be effectively optimized. Accordingly, the gray film is arranged in the reflective region of the yellow filter, and thereby white in the reflective display is more effectively suppressed from having a yellow tinge.

In the present description, the gray film means a film which shows a uniform transmittance at the entire visible wavelength of 400 to 700 nm. Specifically, it means a film which has 0.1% or more and 90% or less of a transmittance when light passes through the film twice at the entire visible wavelength of 400 to 700 nm. Such a film is distinguished from the filter which selectively transmits visible light within a specific wavelength range. It is preferable that the gray film according to the present invention does not include a film which has less than 0.1% (optical concentration D>3) of a transmittance when light passes through the film twice at the entire visible wavelength of 400 to 700 nm. The reason of this is mentioned below. In the reflective region of the filter including the gray film, light which enters the display device passes through the gray film twice and then it is emitted to the outside. If such a gray film is used, the light which has entered the display device is substantially shielded by the gray film and it is not used for display. As a result, the sufficient luminance and color reproduction range are not obtained. For example, it is preferable that the gray film is arranged in the reflective region of the yellow filter because surrounding light which has entered the reflective region of the yellow filter passes through the gray film twice and then it is emitted as yellow light and as a result, a desired light-reducing effect can be obtained.

It is preferable that the gray film has 0.316% of a transmittance obtained when light passes through the film once and 1% or less of a reflectance of the light at the entire visible wavelength of 400 to 700 nm. The material for the gray film and the method of forming it are not especially limited. The same material and formation method as those in the light-shielding member may be mentioned. As a method of adjusting the transmittance of the gray film, a method of controlling the content of a black pigment dispersed into a resin may be mentioned, for example. A light-reducing filter (JIS C1609_4) and the like may be used as the gray film.

The above-mentioned gray film may have a single-layer or multi-layer structure as long as the entire gray film has the above-mentioned optical characteristics. The gray film may be a stacked body consisting of filters having different colors (hereinafter, also referred to as a "color-stacking gray film") as long as the entire gray film has the above-mentioned optical characteristics.

The above-mentioned gray means a dark white color and generally it is an achromatic color. However, the gray may have a tinge of some kind of a color as long as a difference in spectral transmittance between the maximum value and the minimum value is less than 10% (preferably 5%). For example, a bluish, reddish, yellowish, greenish, or purplish gray may be mentioned. For example, if the gray film is arranged in the reflective region of the yellow filter, the gray filter may have a blue tinge that is a complementary color of yellow. According to this, yellow light which has passed through the yellow filter is reduced almost without changing the hue. Therefore, white color in the reflective display can be effectively suppressed from having a yellow tinge.

It is preferable that the light-reducing film is a blue film. According to this, a film of blue that is a complementary color of yellow is arranged in the reflective region of the yellow filter, and thereby light which has passed through the reflective region of the yellow filter can be effectively reduced. As a result, white in the reflective display can be effectively suppressed from having a yellow tinge.

Further, the above-mentioned light-reducing film may be a cyan film. Also in this case, the same operation and effects as in the case where the blue film is arranged can be obtained. However, the dominant wavelength of the cyan color is closer to the long wavelength side than that of blue. Therefore, in comparison to the blue film, the cyan film more largely overlaps with the visible light transmission spectrum of the yellow filter, and therefore the cyan film might transmit light of a green component. That is, if the cyan film is used, an effect attributed to the adjustment of the color temperature of white in the reflective display might be reduced and the tinge of yellow displayed in the reflective display might be different from the hue of yellow. Therefore, the blue film is better than the cyan film in order to optimize the white balance.

It is more preferable that yellow light is emitted from the reflective region of the yellow filter where the blue film reduces light when white is displayed in the reflective display using the standard light source $D_{65}$. According to this, yellow light which has passed through the yellow filter is reduced by the blue film without changing the hue. Therefore, the white balance in the reflective display can be more effectively optimized.

It is preferable that the blue film includes a material for the blue filter. According to this, it is no need to prepare a material for the blue film separately from the material for the filter. Therefore, production costs can be reduced. The blue film may have substantially the same thickness as a thickness of the blue filter. According to this, the blue film can be formed in the same step as the step of forming the blue filter. Therefore, the production steps can be simplified.

It is more preferable that the above-mentioned light-reducing film such as the gray film, the blue film, and the cyan film substantially uniformly reduces light within a wavelength range where a spectral transmittance in the visible light transmission spectrum of the yellow filter, measured by the standard light source $D_{65}$, is 80% or more (hereinafter, also referred to as "the first wavelength region"). According to this, yellow light which has passed through the yellow filter is reduced by the light-reducing film almost without changing the hue. Therefore, the white balance in the reflective display can be more effectively optimized. In the present description, in the case where the light-reducing film substantially uniformly reduces the light in the first wavelength region, a difference in the amount of light reduced by the light-reducing film between light having a wavelength a and light having a wavelength b is within ±20%, when any wavelengths in the first wavelength region are defined as a wavelength a and a wavelength b (a≠b).

It is preferable that a total thickness of the light-reducing film and the filter on which the light-reducing film is arranged is substantially the same as a thickness of another filter. According to this, the substrate surface can be flattened and therefore uneven display can be reduced. In order to more flatten the substrate surface, it is preferable that a total thickness of the light-reducing and the filter on which the light-reducing film is arranged is substantially the same as a thickness of each of the other filters having different colors in the same pixel. The "substantially the same" includes a case where the total thickness is perfectly the same and a case where it can be identified to be substantially the same in terms of reduction in uneven display.

It is preferable that the display device is a liquid crystal display device, and the blue film makes a thickness of a liquid crystal layer in the reflective region of the yellow filter smaller than a thickness of the liquid crystal layer in the transmissive region of the yellow filter. As mentioned above, the multi-gap layer is generally arranged in the reflective region. According to this configuration, the multi-gap layer arranged in the reflective region of the yellow filter can be used as a blue film. Therefore, the blue film needs not to be additionally arranged. As a result, the production costs can be reduced. In this case, the color of the multi-gap layer in the reflective region of the other filters is not especially limited.

It is preferable that the light-reducing film is arranged in the reflective region of each of the three or more filters having different colors. According to this, the quantity of light emitted from the respective reflective regions can be controlled in the respective filters having different colors. Therefore, the white balance in the reflective display can be effectively optimized.

If the above-mentioned light-reducing film is arranged in the reflective region of each of the three or more filters having different colors, it is preferable that the display device is a liquid crystal display device, and the light-reducing film makes a thickness of a liquid crystal layer in the reflective region smaller than a thickness of the liquid crystal layer in the transmissive region. According to this embodiment, the multi-gap layer arranged in the reflective region of each filter can be used as the light-reducing film. Therefore, the light-reducing film needs not to be additionally arranged. As a result, the production costs can be reduced.

If the above-mentioned light-reducing film is formed in the reflective region of each of the three or more filters having different colors, it is preferable that a red filter, a green filter, a blue filter, and a yellow filter are arranged in the pixel, and the light-reducing film is a bluish film (a blue film). Generally, the standard light source $D_{65}$ is more yellowish than a backlight used in transmissive light. Therefore, according to this embodiment, the color temperature can be improved, and depending on the design, the yellow tinge of white in the reflective display can be canceled. As such an embodiment, an embodiment shown in FIG. 13 may be mentioned, for example. According to the embodiment in FIG. 13, the bluish light-reducing film needs not to be additionally formed. As a result, production costs can be reduced. According to the embodiment in FIG. 13, the multi-gap layer is tinged with blue in the reflective region of every filter. Therefore, the multi-gap layer can be used as the light-reducing film, and the light-reducing film needs not to be additionally formed. As a result, the production costs can be reduced.

It is preferable that in every pixel, the red filter, the green filter, the blue filter, and the yellow filter are arranged in a stripe pattern in this order. According to this, in both of the transmissive display and the reflective display, red and green, and yellow and blue, which are pairs of complementary color, are disposed to be adjacent to each other. Further, green and yellow each having a high luminance are arranged at the center of the pixel. Therefore, coloring of a white line which is displayed using a mixed color on a black base can be reduced.

It is preferable that the display device is a liquid crystal display device. According to the display device of the present invention, the color reproduction range can be extended, and further the difference in white balance between the transmissive display and the reflective display can be reduced. Therefore, a liquid crystal display device with high display qualities can be provided. Examples of the display mode of the liquid crystal display device include a vertical alignment (VA) mode, a multi-domain vertical alignment (MVA) mode, an in-plane switching mode (IPS) mode, and a twist-nematic (TN) mode. According to the display device of the present invention, the operation and effects of the present invention can be obtained regardless of the display mode as long as the display device has the above-mentioned configuration.

EFFECT OF THE INVENTION

According to the display device of the present invention, in the reflective region of a filter of at least one color, a film which reduces an amount of at least light having a peak wavelength of a visible light transmission spectrum of the filter of at least one color, measured by the standard light source $D_{65}$ is arranged. As a result, the optical characteristics of the light-reducing film can be properly adjusted, and thereby the white balance in the reflective display can be optimized and the difference in the white balance between the transmissive display and the reflective display can be reduced.

BEST MODES FOR CARRYING OUT THE INVENTION

The present invention is mentioned in more detail below with reference to Embodiments, but not limited to only these Embodiments.

The display devices in accordance with Embodiments of the present invention are transflective liquid crystal display devices. That is, according to the transflective liquid crystal display devices, transmissive display using light from the backlight is mainly observed under relatively dark environments such as indoor environment. Under relatively bright environments such as outdoor environment, reflective display using surrounding light is mainly observed.

1. Adjustment of White Balance in Reflective Display by Gray Resin Film (1) Configuration of Liquid Crystal Display Device (1-1) Embodiment 1

FIG. 1(a) is a planar view schematically showing a configuration of a pixel in a transflective display device in accordance with Embodiment 1 of the present invention.

As shown in FIG. 1(a), according to the display device in accordance with the present Embodiment, a red filter 10R, a green filter 10G, a yellow filter 10Y, and a blue filter 10B are arrayed in a stripe pattern in this order. Between two of these filters, a black matrix 10BM is arranged. According to the present embodiment, the pixel has the same array of the filters. In the pixel, each filter has a reflective region a and a transmissive region b. The reflective region a is a pixel region used for reflective display. The transmissive region b is a pixel region used for transmissive display. According to the present Embodiment, a gray resin film 10Gy is selectively arranged only in a reflective region Ya of the yellow filter 10Y. The configuration of the cross-section of the display device in accordance with the present Embodiment is mentioned below.

FIG. 1(b) is a schematic cross-sectional view taken along line P-Q in FIG. 1(a).

The display device in accordance with the present Embodiment has a configuration in which a liquid crystal layer 13 is arranged between a counter substrate 11 and a pixel substrate 12, as shown in FIG. 1(b).

The counter substrate 11 includes a retarder 22 and a polarizer 23 on the outer side (observation surface side) of a glass substrate 21, and further includes the red filter 10R, the green filter 10G, the blue filter 10B, the yellow filter 10Y, a gray resin film 10Gy, a black matrix 10BM, an overcoat layer 25, a counter electrode 26, and an alignment film 27 on the inner side (back surface side) of the glass substrate 21.

The retarder 22 adjusts polarization state of light which passes therethrough. The polarizer 23 transmits only light having a specific polarization component. According to the present Embodiment, the retarder 22 and the polarizer 23 are set to function as a circular polarizer by adjusting the arrangement and configuration thereof.

The red filter 10R, the green filter 10G, the blue filter 10B, and the yellow filter 10Y each select a color of light which passes therethrough. Spectral characteristics of the respective filters used in the present Embodiment are shown in FIG. 2. As shown in FIG. 2, with regard to the filters having three primary colors, the red filter 10R mainly transmits a red component of incident light; the green filter 10G mainly transmits a green component of incident light; and the blue filter 10B mainly transmits a blue component. The yellow filter 10Y mainly transmits both color components of the red component and the green component of incident light. According to the present Embodiment, the size and thickness of the filter are almost the same between the reflective region a and the transmissive region b. However, they may not be necessarily the same. The luminance of light which passes through each color filter is changed if the size or thickness of the filter is changed. Therefore, it is preferable that the respective filters having different colors are designed in such a way that the white balance is maintained.

According to the present Embodiment, the gray resin film 10Gy is formed only in the reflective region Ya of the yellow filter 10Y. FIG. 3 shows spectral characteristics of the gray resin film 10Gy used in the present Embodiment. As shown in FIG. 3, the gray resin film 10Gy reduces incident light at the entire visible wavelength range of 400 to 700 nm at almost the same ratio. The gray resin film 10Gy is formed directly on the yellow filter 10Y, as shown in FIG. 1 (b). The position where the gray resin film 10Gy is arranged is not especially limited as long as it is the reflective region Ya of the yellow filter 10Y. For example, the gray resin film 10Gy may be formed between the glass substrate 21 and the yellow filter 10Y or between the overcoat layer 25 and the counter electrode 26.

The overcoat layer 25 prevents contaminants from entering the liquid crystal layer 13 from the red filter 10R, the green filter 10G, and the blue filter 10B, and the yellow filter 10Y. The overcoat layer 25 flattens the surface of the counter substrate 11. The counter electrode 26 faces the reflective electrode 34 and the transparent electrode 35 arranged on the pixel substrate 12 side with the liquid crystal layer 13 therebetween. The counter electrode 26 is used to drive liquid crystal molecules by applying a voltage to the liquid crystal layer 13. The alignment film 27 controls alignment of liquid crystal molecules in the liquid crystal layer 13.

The pixel substrate 12 includes a retarder 32 and a polarizer 33 on the outer side (back surface side) of the glass substrate 31 and further includes a projection (multi-gap layer) 37, a reflective electrode 34 which also serves as a reflective member, a transparent electrode 35 and an alignment film 38 on the inner side (observation surface side) of the glass substrate 31. The projection 37 and the reflective electrode 34 are formed in the reflective region a. The transparent electrode 35 is formed in the transmissive region b.

The retarder 32 adjusts polarization state of light which passes therethrough, similarly to the retarder 22. The polarizer 33 transmits only light having a specific polarization component, similarly to the polarizer 23. According to the present Embodiment, the retarder 22 and the polarizer 23 are set to function as a circular polarizer by adjusting the arrangement and configuration thereof. This circular polarizer is arranged to be optically perpendicular to the circular polarizer arranged on the counter substrate 11 side.

The projection 37 is arranged in each reflective region a of the red filter 10R, the green filter 10G, the blue filter 10B, and the yellow filter 10Y. According to the present Embodiment, the projection 37 is formed on the pixel substrate 12 side, and thereby the cell thickness in the reflective region a becomes smaller than the cell thickness in the transmissive region b.

The reflective electrode 34 is an electrode which has a light reflective function and it is formed on the projection 37. This reflective electrode 34 reflects surrounding light and drives liquid crystal molecules by applying a voltage to the liquid crystal layer 13. The reflective electrode 34 is used for reflective display. The reflective electrode 34 is formed of a metal of aluminum (A1) and the like.

According to the present Embodiment, the reflective electrode 34 serves as both of the material for reflecting surrounding light and the electrode for driving the liquid crystal molecules. Alternatively, the display device may have a configuration in which a reflective member which has no function as an electrode and an electrode is separately formed in a region corresponding to the region where the reflective member is arranged. In this case, the reflective member may be arranged on the back surface side of the glass substrate 31 or the liquid crystal layer 13 side. If the reflective member is arranged on the back surface side of the glass substrate 31, the optical path length is extended and a difference in visual observation is generated. Therefore, it is preferable that the reflective member is arranged on the liquid crystal layer 13 side of the glass substrate 31. The transparent electrode 35 is an electrode formed of a transparent conductive material such as indium tin oxide (ITO). The reflective electrode 34 and the transparent electrode 35 are formed in every film on the counter substrate 11 side and apply a voltage to the liquid crystal layer 13 in each film region, thereby driving liquid crystal molecules. The alignment film 38 controls alignment of the liquid crystal molecules in the liquid crystal layer 13, similarly to the alignment film 27.

A liquid material with negative dielectric anisotropy is charged into the liquid crystal layer 13. Accordingly, a voltage which is applied between the electrodes is zero or less than a threshold value, the liquid crystal molecules are vertically aligned to the glass substrates 21 and 31. In this case, the liquid crystal layer 13 does not transmit light to the outside. Therefore, the display device in accordance with the present Embodiment performs display in normally black mode. According to the present Embodiment, a nematic liquid crystal having a refractive index anisotropy of 0.0655 is used as a liquid crystal material.

FIG. 4 is a graph showing measurement results of a spectral transmittance and a spectral reflectance of the liquid crystal layer 13. The spectral reflectance is a ratio of an amount of light which enters the display device from the outside to an amount of light which is reflected by the reflective region a and emitted as reflective display light to the outside. The spectral transmittance is a ratio of an amount of light from a backlight 36 to an amount of light which passes through the transmissive region b and emitted as the transmissive display light to the outside.

On the back face (back surface) side of the pixel substrate 12, the backlight 36 for transmissive display is arranged. Optical characteristics and the like of the light source used as the backlight 36 are mentioned in the following (2).

(1-2) Comparative Embodiment 1

FIG. 5(a) is a planar view schematically showing a configuration of pixels in a transflective display device in accordance with Comparative Embodiment 1. FIG. 5(b) is a schematic view showing a configuration of a cross-section taken along line P-Q in FIG. 5(a).

The display device in accordance with the present Comparative Embodiment has the same configuration as in Embodiment 1, except that the gray film 10Gy is not arranged in the reflective region Ya of the yellow filter 10Y, as shown in FIGS. 5(a) and 5(b).

(1-3) Reference Embodiment 1

FIG. 6(a) is a planar view schematically showing a configuration of pixels in a transflective display device in accordance with Reference Embodiment 1. FIG. 6(b) is a schematic view showing a configuration of a cross-section taken along line P-Q in FIG. 6(a).

The display device in accordance with the present Reference Embodiment has the same configuration as in Embodiment 1, except that the black matrix 10BM is arranged in the reflective region Ya of the yellow filter 10Y, as shown in FIGS. 6(a) and 6(b).

(2) Display Quality Test of Transmissive Display and Reflective Display (2-1) Calculation Method of Color Temperature The liquid crystal display devices according to Embodiment 1, Comparative Embodiment 1, and Reference Embodiment 1 were subjected to a white balance evaluation test. The white balance is generally expressed as a color temperature (color temperature of white display). Accordingly, in this evaluation test, the following calculation method is employed. Chromaticity coordinates (x, y) in the XYZ color system (CIE 1931 standard colorimetric system) when the liquid crystal display device displays white are measured. Then, using the measured chromaticity coordinates, the color temperature (relative color temperature) $T_c$ is calculated from the following formula (referring to MaCcamy, C. S., Correlated color temperature as an explicit function of chromaticity coordinates, ColorRes. Appl. 17, 142 to 144 (1992)).

$T_c = -437n^3 + 3601n^2 - 6861n + 5514.31$, where n is expressed as $n = (x - 0.3320)/(y - 0.1858)$ (2-2) Measurement Method of White Balance in Transmissive Display Liquid crystal display devices in Embodiment 1, Comparative Embodiment 1, and Reference Embodiment 1 perform transmissive display using the red filter 10R, the green filter 10G, the blue filter 10B, and the yellow filter 10Y. If a light source corresponding to spectral characteristics of the filters 10R, 10G, and 10B which are filters having three primary colors of red, green, and blue are used, the white balance is shifted to yellow and the color temperature is lowered. Therefore, in order to optimize the white balance in the transmissive display, light sources α to γ in FIG. 7 were used as the light source in the backlight 36. Further, chromaticity coordinates (x, y) when white was displayed in the transmissive display were measured using a spectroradiometer (product of TOPCON TECHNOHOUSE CORPORATION, trade name: SR-3).

Each of the light sources α to γ emits bluish light having a higher color temperature in comparison to light emitted from a light source used in the configuration in which filters having three primary colors of red, green, and blue are used for the transmissive display. As shown in FIG. 7, light emission spectrums of the light sources α to γ are different from each other. Specifically, the light source γ emits light with the weakest blue (the light source γ has the lowest color temperature) and the light source α emits light with the strongest blue (the light source α has the highest color temperature).

(2-3) Measurement Method of White Balance in Reflective Display

The liquid crystal display device uses surrounding light as the light source when it performs reflective display. In this evaluation test, a xenon (Xe) lamp (standard light source $D_{65}$) was used as the light source for the reflective display and chromaticity coordinates (x, y) when white was displayed were measured using a spectroradiometer (product of TOPCON TECHNOHOUSE CORPORATION, trade name: SR-3).

(2-4) Evaluation of Difference in White Balance Between Transmissive Display and Reflective Display Excellent display qualities in both of the transmissive display and the reflective display can be maintained if the color temperature of white in the reflective display is from 5000 to 10000 K and a difference in color temperature of white between the reflective display and the transmissive display is 2000 K or less, generally. According to the above-mentioned methods (2-1) to (2-3), color temperatures (relative color temperatures) when white is displayed in the transmissive display and the reflective display were measured. Based on these results, the difference in color temperature between the modes (hereinafter, also referred to as a "difference between the modes") was calculated. Table 1 shows the results.

TABLE 1

| | Color temperature of reflective display (K) | Difference between the modes (K) |
|---|---|---|
| Embodiment 1 | 5700~7000 | ≦2000 |
| Comparative Embodiment 1 | 3800~4900 | ≧2500 |
| Reference Embodiment 1 | 6000~9500 | ≦2000 |

According to Embodiment 1, the gray resin film 10Gy is selectively arranged in the reflective region Ya of the yellow filter 10Y. Therefore, the amount of yellow light emitted from the reflective region Ya of the yellow filter 10Y was reduced. As a result, the color temperature of white in the reflective display was 5700 K or more and the Y value (luminous transmittance) was 6.7 to 7.5. The color temperature of white in the reflective display could be adjusted to be within a proper range while a high luminance was maintained, and then the difference in color temperature between the modes could be reduced to 2000 K or less. In contrast, according to Reference Embodiment 1, the black matrix 10BM is arranged in the reflective region Ya of the yellow filter 10Y. When the amount of yellow light emitted from the reflective region Ya of the yellow filter 10Y was zero, the color temperature of white in the reflective display was about 6000 to 9500 K and it could be adjusted to be within a proper range. As a result, the difference in color temperature between the modes could be reduced to 2000 K or less. However, the Y value (luminous transmittance) was 5 to 7 and the luminance was reduced. Further, according to Comparative Embodiment 1, the Y value (luminous transmittance) was 13.5 to 9.11 and sufficient luminance could be obtained. However, the color temperature of white in the reflective display was 3800 to 4900 K. The white balance was shifted to yellow, and further the difference in color temperature between the modes was 2500 K or more. Thus, the difference in display quality between the transmissive display and the reflective display became larger.

(2-5) Evaluation of Color Reproduction Range in Transmissive Display and Reflective Display The reproduction range of the color filter is expressed as an area of a polygonal obtained by plotting color coordinates (x, y) of each filter on the xy chromaticity diagram in the XYZ color system (CIE 1931 standard colorimetric system). The area of the color reproduction range is changed depending on the number of color of the filters and the color purity.

The Red filter 10R, the green filter 10G, the blue filter 10B, and the yellow filter 10Y in Embodiment 1 and those in Reference Embodiment 1 have the same color purity. According to Embodiment 1, the reflective display is performed using the red filter 10R, the green filter 10G, the blue filter 10B, and the yellow filter 10Y. In contrast, according to Reference 1, the reflective display is performed using the filters having three primary colors, i.e., the red filter 10R, the green filter 10G, and the blue filter 10B. Therefore, in Embodiment 1, the polygonal obtained by plotting the color coordinates on the xy chromaticity diagram has an area larger than that of a polygonal in Reference Embodiment 1. That is, according to Embodiment 1, the reflective display with a larger color reproduction range can be performed in comparison to Reference Embodiment 1.

(3) Operation and Effects of Liquid Crystal Display Device in Accordance with Embodiment 1 of the Present Invention The liquid crystal display device in accordance with Embodiment 1 of the present invention display white in the transmissive display and reflective display using the red filter 10R, the green filter 10G, the blue filter 10B, and the yellow filter 10Y. Such a liquid crystal display device in accordance with Embodiment 1 can optimize the white balance in the transmissive display using a light source having a high color temperature as the backlight 36. Further, the gray film 10Gy is arranged in the reflective region Ya of the yellow filter 10Y and the amount of yellow light emitted from the reflective region Ya of the yellow filter is reduced. As a result, white in the reflective display can be suppressed from having a yellow tinge. As a result, the difference in white balance between the transmissive display and the reflective display can be reduced, and excellent display qualities can be maintained. In addition, the liquid crystal display device can perform display with a large color reproduction range because the transmissive and reflective displays are performed using the red filter 10R, the green filter 10G, the blue filter 10B, and the yellow filter 10Y. In both of the transmissive display and the reflective display, the white balance can be adjusted to a more preferable one by appropriately adjusting spectral characteristics of the red filter 10R, the green filter 10G, the blue filter 10B, and the yellow filter 10Y or the cell thickness of the liquid crystal layer 13, and/or the color temperature of the light source in the backlight 36.

2. Adjustment of White Balance in Reflective Display by Blue Resin Film (1) Basic Configuration of Liquid Crystal Display Devices According to Embodiments 2 to 10 of the Present Invention FIG. 8(a) is a planar view schematically showing a configuration of pixels in transflective display devices according to Embodiments 2 to 10 of the present invention. FIG. 8(b) is a schematic view showing a configuration of a cross-section taken along line P-Q in FIG. 8(a).

The display devices according to Embodiments 2 to 10 of the present invention have the same configuration as in Embodiment 1, except that a blue film 10B' is selectively arranged in the reflective region Ya of the yellow filter 10Y instead of the gray resin film 10Gy, as shown in FIGS. 8(a) and 8(b). According to the present Embodiment, the blue film 10B' is formed of the same material as in the blue filter 10B. However, the blue film 10B' may be formed of another material as long as it mainly contains a blue component. In FIG. 8(b), in order to flatten the surface of the counter substrate 11, the total thickness (Ty+Tb') of the thickness (Ty) of the yellow filter 10Y in the reflective region Ya of the yellow filter 10Y and the thickness (Yb') of the blue filter 10B' is almost the same as the thickness of each of the red filter 10R, the green filter 10G, and the blue filter 10B, and the thickness of the yellow filter 10Y in the transmissive region Yb. The thickness of each filter and the blue film 10B', and the film ratio are not especially limited to those mentioned above. For example, the following configuration shown in FIG. 9 may be mentioned. The red filter 10R, the green filter 10G, the blue filter 10B, and the yellow filter 10Y have the same thickness, and the blue film 10B' is stacked in the reflective region Ya of the yellow filter 1Y. The method of stacking the blue film 10B' is not especially limited. A method of simultaneously preparing the blue film 10B' and the blue filter having different thicknesses using a half tone mask, or a method of increasing the number of steps and separately forming the blue film 10B' and the blue filter, may be mentioned.

(2) Influence on Spectral Characteristics of Stacked Body by Thickness of Blue Resin Film and Yellow Filter FIG. 10 is a graph showing spectral characteristics of the yellow filter 10Y, the blue resin film 10B', and a stacked body (hereinafter, also referred to as a "YB' stacked body") of the yellow filter 10Y and the blue resin film 10B' when both of the thickness (Ty) of the yellow filter 10Y and the thickness (Yb') of the blue resin film 10B' are each 1.8 μm.

In this case, the spectral transmittance was measured using a microspectrophotometer (product of OLYMPUS Corp., trade name: OSP-SP200). The YB' stacked body showed spectral characteristics shown in FIG. 10. Chromaticity coordinates (x, y) were measured using a spectroradiometer (product of TOPCON TECHNOHOUSE CORPORATION, trade name: SR-3). The chromaticity coordinates of light which had passed through the YB' stacked body were expressed as (0.155, 0.635) on the xy chromaticity diagram in the XYZ color system. The color of this transmitted light was expressed as green having a dominant wavelength of 520 nm if xy chromaticity coordinates (0.313, 0.329) of color of $D_{65}$ light source is defined as a standard white chromaticity.

FIG. 11 is a view showing spectral characteristics of the yellow filter 10Y, the blue resin film 10B', and the YB'stacked body when the Ty is 1.8 μm and Tb' is 0.3 μm.

In this case, the spectral transmittance of the YB' stacked body was measured using a microspectrophotometer (product of OLYMPUS Corp., trade name: OSP-SP200). The YB' stacked body showed spectral characteristics shown in FIG. 11. Chromaticity coordinates (x, y) were measured using a spectroradiometer (product of TOPCON TECHNOHOUSE CORPORATION, trade name: SR-3). The chromaticity coordinates of light which had passed through the YB' stacked body were expressed as (0.457, 0.520) on the xy chromaticity diagram in the XYZ color system. The color of this transmissive light was expressed as yellow having a dominant wavelength of 573 nm if xy chromaticity coordinates (0.313, 0.329) of color of $D_{65}$ light source is defined as a standard white chromaticity.

Accordingly, the thickness and the spectral characteristics of the blue film 10B' are adjusted, and thereby the characteristics of transmissive light from the reflective region Ya of the yellow filter 10Y can be adjusted. In some cases, yellow light can be emitted without changing the hue of the transmissive light.

For example, as shown in FIG. 11, if the color is adjusted in such a way that the visible light transmission spectrum of the blue resin film 10B' hardly overlaps with the visible light transmission spectrum of the yellow filter 10Y, the YB' stacked body can reduce the transmission spectrum of the yellow filter 10Y at a uniform ratio. Therefore, the dominant wavelength of transmissive light is not largely shifted from the dominant wavelength region of yellow.

(3) Display Quality Test of Transmissive Display and Reflective Display a transflective liquid crystal display device having the configuration shown in FIGS. 8(*a*) and 8(*b*). The transflective liquid crystal display device has the configuration of the YB' stacked body in the reflective region Ya of the yellow filter 10Y. The color temperature of white in the reflective display was calculated from the above formula based on chromaticity coordinates measured in the following manner. A xenon (Xe) lamp (standard light source $D_{65}$) was used as the light source for the reflective display and chromaticity coordinates (x, y) of white in the reflective display were measured using a spectroradiometer (product of TOPCON TECHNOHOUSE CORPORATION, trade name: SR-3). Further, the luminous transmittance Y was calculated from the formula for determining XYZ based on the spectral transmittance measured using a microspectrophotometer (product of OLYMPUS Corp., trade name: OSP-SP200). The red filter 10R, the green filter 10G, and the blue filter 10B have the same thickness of 1.8 μm. In every filter, the cell thickness of the liquid crystal layer 13 is the same between the transmissive region and the reflective region.

TABLE 2

| | | YB' stacked body (reflective region of Y filter in display device) | | | | White in reflective display of display device | |
|---|---|---|---|---|---|---|---|
| | Kind | Y filter Ty (μm) | Blue film B' Tb' (μm) | Dominant wavelength (nm) | Luminous transmittance Y (%) | Color temperature (K) | Luminous transmittance Y (%) |
| Embodiment 2 | A3 | 1.8 | 0.30 | 560 | 29.8 | 6938 | 7.8 |
| Reference Embodiment 2 | A1 | 1.8 | 1.80 | 520 | 2.8 | 8331 | 5.9 |
| Comparative Embodiment 2 | A2 | 1.8 | 0.00 | 575 | 75.9 | 4900 | 10.8 |
| Embodiment 3 | B1 | 1.5 | 0.15 | 567 | 55.5 | 5780 | 9.0 |
| Embodiment 4 | B2 | 1.5 | 0.25 | 562 | 35.5 | 6750 | 8.2 |
| Embodiment 5 | B3 | 1.5 | 0.30 | 559 | 31.1 | 7000 | 7.9 |
| Comparative Embodiment 3 | B4 | 1.5 | 0.00 | 574 | 77.8 | 4950 | 10.98 |
| Embodiment 6 | C1 | 1.2 | 0.15 | 566 | 49.3 | 6200 | 9.1 |
| Embodiment 7 | C2 | 1.2 | 0.25 | 560 | 37.2 | 6800 | 8.3 |
| Reference Embodiment 3 | C3 | 1.2 | 0.00 | 574 | 80 | 5000 | 11.1 |
| Embodiment 8 | D1 | 0.9 | 0.15 | 564 | 51.6 | 6400 | 9.3 |
| Embodiment 9 | D2 | 0.9 | 0.20 | 561 | 44.9 | 6700 | 8.8 |
| Reference Embodiment 4 | D3 | 0.9 | 0.00 | 573 | 82.8 | 5200 | 11.3 |
| Embodiment 10 | E1 | 0.6 | 0.15 | 562 | 54.8 | 6800 | 9.5 |
| Reference Embodiment 5 | E2 | 0.6 | 0.00 | 573 | 86.4 | 5400 | 11.6 |

The left part in Table 2 shows dominant wavelengths and luminous transmittances Y of the YB' stacked body when the Ty and Tb' were variously changed. The dominant wavelength was calculated in the following manner. A xenon (Xe) lamp (standard light source $D_{65}$) was used as the light source for the reflective display and chromaticity coordinates (x, y) of light which had passed through the stacked body were measured using a spectroradiometer (product of TOPCON TECHNOHOUSE CORPORATION, trade name: SR-3). The chromaticity coordinates (x,y) were plotted on the xy chromaticity diagram in the XYZ color system. The luminous transmittance Y was calculated from formulae for determining XYZ based on spectral transmittance measured using a microspectrophotometer (product of OLYMPUS Corp., trade name: OSP-SP200). The spectral characteristics of the stacked bodies A1, A2, B1, B3, and E1 in Table 2 are shown in FIG. 12.

The right part in Table 2 shows a color temperature and a luminous transmittance Y of white in the reflective display of Excellent display qualities in both of the transmissive display and the reflective display can be maintained if the color temperature of white in the reflective display is from 5000 to 10000 K and a difference in color temperature of white between the reflective display and the transmissive display is 2000 K or less, generally. As shown in comparison between Embodiment 1 and Comparative Embodiment 2, if the blue film 10B' is stacked on the yellow filter 10Y, the color temperature of white in the reflective display can be effectively improved in the liquid crystal display device. According to the configuration of the stacked body A1, a red component was hardly transmitted and the dominant wavelength of the transmissive light was in a green dominant wavelength region. However, according to the stacked bodies other than the stacked body A1, the dominant wavelength of transmissive light was within a yellow dominant wavelength region of 558 to 597 nm. That is, according to the configurations other than that of the YB, stacked body A1, only the light amount of the yellow transmissive light from the reflective region Ya of the yellow filter 10Y can be reduced and emitted almost without changing the hue.

(a) Embodiment 2, Comparative Embodiment 2, and Reference Embodiment 2 (Ty 1.8 µm (A1 to A3)

According to Embodiment 2 (A3), the blue film 10B' having a small thickness was selectively arranged in the reflective region Ya of the yellow filter 10Y, and the amount of yellow light emitted from the reflective region Ya of the yellow filter was reduced. As a result, the color temperature of white in the reflective display was 6938K and the luminous transmittance Y of white display was 7.8. The color temperature of white in the reflective display could be adjusted to a proper range, and sufficient luminance could be maintained. However, according to Comparative Embodiment 2 (A2), the color temperature of white in the reflective display was smaller than 5000 K. The luminous transmittance Y at the white display was 10.8, and the sufficient luminance was obtained. However, the white balance was shifted to the yellow side. According to Reference Embodiment 2 (A1), as shown in Table 2, light emitted from the reflective region Ya of the yellow filter was tinged with green. Further, the luminous transmittance Y at the white display was reduced to 5.94. Therefore, the effects were insufficient.

(b) Embodiments 3 TO 5 and Comparative Embodiment 3 ((B1 TO B4) when Ty is 1.5 µm)

According to Embodiments 3 to 5 (B1 to B3), the color temperature of white in the reflective display could be more improved within a proper range by forming the yellow filter 10Y having a thickness (Ty) smaller than that in Embodiment 2 (A3). According to Comparative Embodiment 3 (B4), the color temperature of white in the reflective display could be improved more than that in Comparative Embodiment 2. However, the color temperature of white in the reflective display was smaller than 5000 K, and the luminous transmittance Y in the white display was 10.98. The luminance was sufficient, but the white balance was shifted to the yellow side.

(c) Embodiments 6 and 7 and Reference Embodiment 3 ((C1 TO C3 when Ty is 1.2 µm)

According to Embodiments 6 and 7 (C1 and C2), the color temperature of white in the reflective display could be more improved within a proper range by forming the yellow filter 10Y having a thickness (Ty) smaller than that in Embodiments 3 and 4 (B1 and B2). In Reference Embodiment 3, the blue film 10B' was not arranged in the reflective region Ya of the yellow filter, but the color temperature of white in the reflective display could be adjusted to a proper range by forming the yellow filter 10Y having a thickness (Ty) smaller than that in Comparative Embodiment 3 (B4)

(d) Embodiments 8 and 9 and Reference Embodiment 4 ((D1 TO D3 when Ty is 0.9 µm)

(e) Embodiment 10 and Reference Embodiment 5 ((E1 and E2 when Ty is 0.6 µm)

According to Embodiments 8 and 10 (D1 and E1), the color temperature of white in the reflective display could be more improved within a proper range by forming the yellow filter 10Y having a thickness (Ty) smaller than that in Embodiment 6 (C1). Also in Embodiment 9 (D2), the same operation and effects could be exhibited. Further, according to References 4 and 5 (D3 and E2), the blue film 10B' was not arranged in the reflective region Ya of the yellow filter 10Y. However, if the thickness (Ty) of the yellow filter 10Y was more reduced than that in Reference Embodiment 3 (C3), the color temperature of white in the reflective display could be more improved.

3. Modified Embodiment of Display Devices in Accordance with Embodiments 1 to 10 of the Present Invention According to the display devices in the present Embodiments of the present invention, the transmissive display using light from a backlight is dominant under dark environment and the reflective display using surrounding light is dominant under bright environment. However, the configuration of the display device is not limited to such a configuration, and the display device may be configured to select either of the transmissive or reflective display depending on surrounding light intensity and switch a method of driving liquid crystals in accordance with the selected display mode.

According to the display devices in accordance with Embodiments of the present invention, a gray resin film or a blue resin film is additionally arranged in the reflective region of the yellow filter. However, for example, an embodiment in which the yellow filter is arranged using a proper amount of a mixture prepared by previously adding a black or blue component (absorptive medium) contained in the gray or blue resin film into the material for the yellow filter is also mentioned as a configuration which exhibits the same operation and effects as in the display device according to Embodiments of the present invention. This is because such a yellow filter shows the same spectral characteristics as in the embodiment in which the gray or blue film is stacked on the yellow filter.

The liquid crystal display devices according to the present Embodiments are transflective liquid crystal display devices, but such devices may be configured as a display device in another system. That is, the present display device can be applied to display devices in any systems as long as it is a display device in which display is performed using a color filter having multi-colors in both of the reflection display and the transmission display. The configuration of the present display device can be applied, for example, to an organic EL display called a self-emitting display, which performs display as a hybrid with a liquid crystal display device using different filters between the transmissive region and the reflective region.

The present application claims priority under the Paris Convention and the domestic law in the country to be entered into national phase on Patent Application No. 2006-077733 filed in Japan on Mar. 20, 2006, the entire contents of which are hereby incorporated by reference.

In the present description, the terms "or more" and "or less" mean that the described value is included. That is, the term "or more" means that the described value and values higher than the described value are included. The term "or less" means that the described value and values lower than the described value are included.

Figure 1:
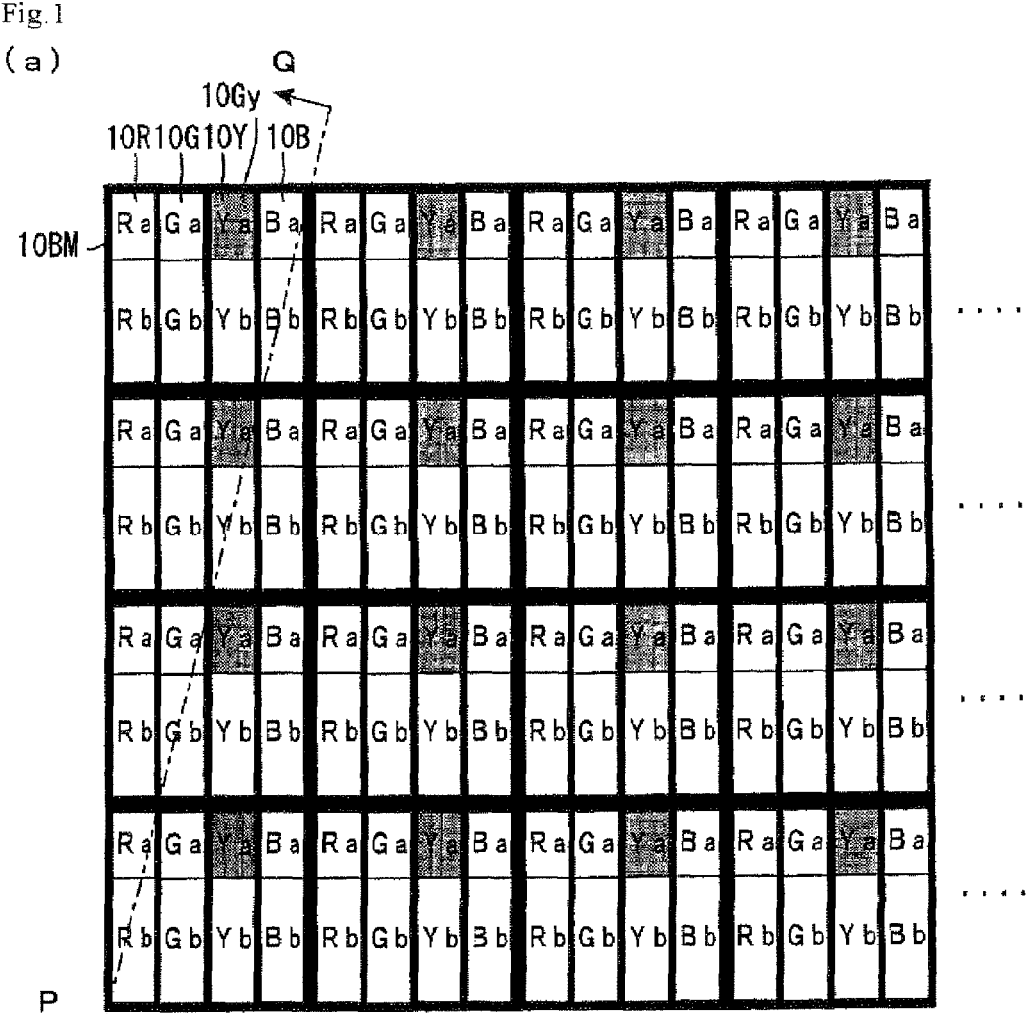
FIG. 1(a) is a planar view schematically showing a configuration of pixels in the transflective display device in accordance with Embodiment 1 of the present invention. FIG.
Figure 1:
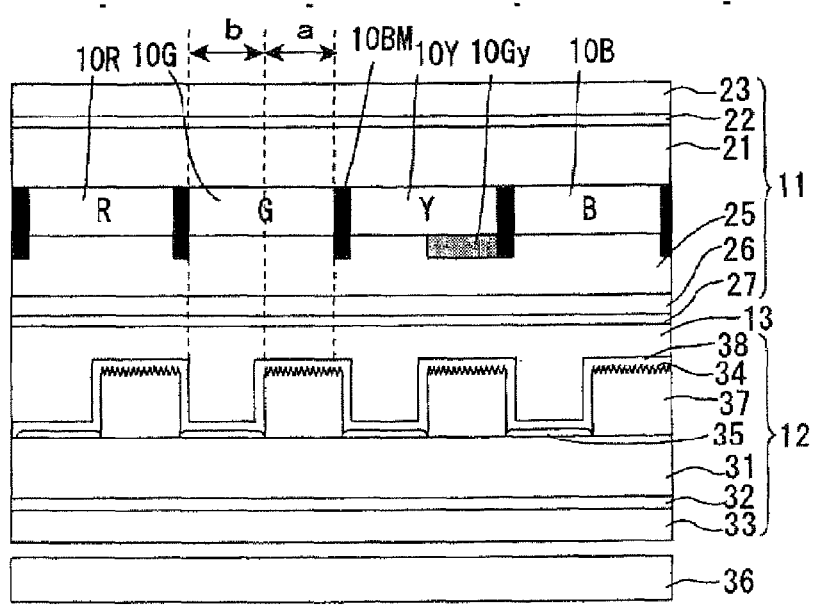

1(b) is a schematic view showing a configuration of a cross-section taken along line P-Q in FIG. 1(a).

Figure 2:
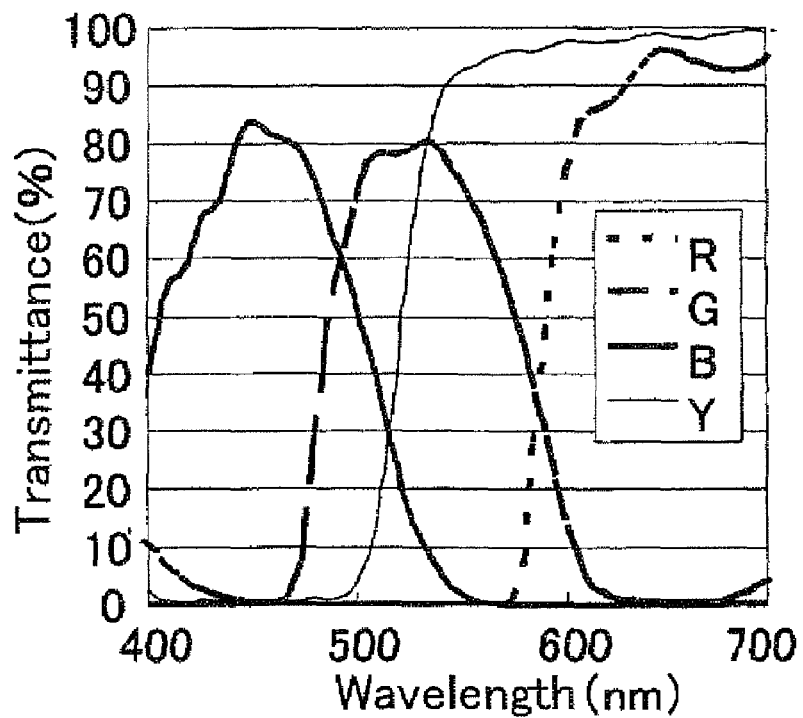

FIG. 2 is a graph schematically showing spectral characteristics of the four filters with red, green, blue, and yellow used in Embodiments of the present invention.

Figure 3:
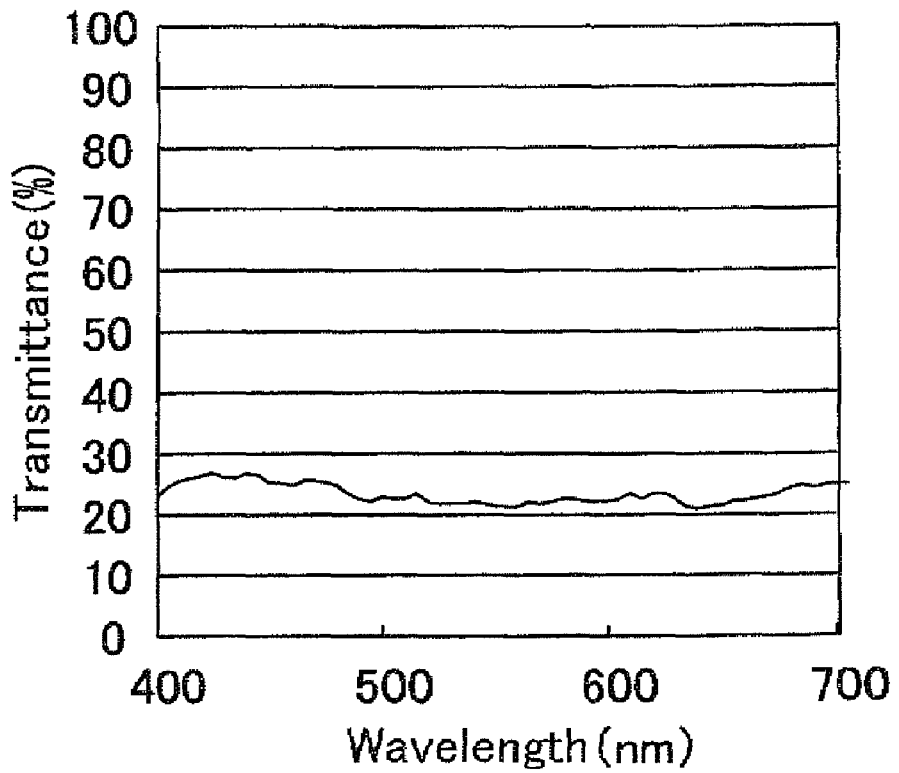

FIG. 3 is a graph showing spectral characteristics of the gray film used in Embodiments of the present invention.

Figure 4:
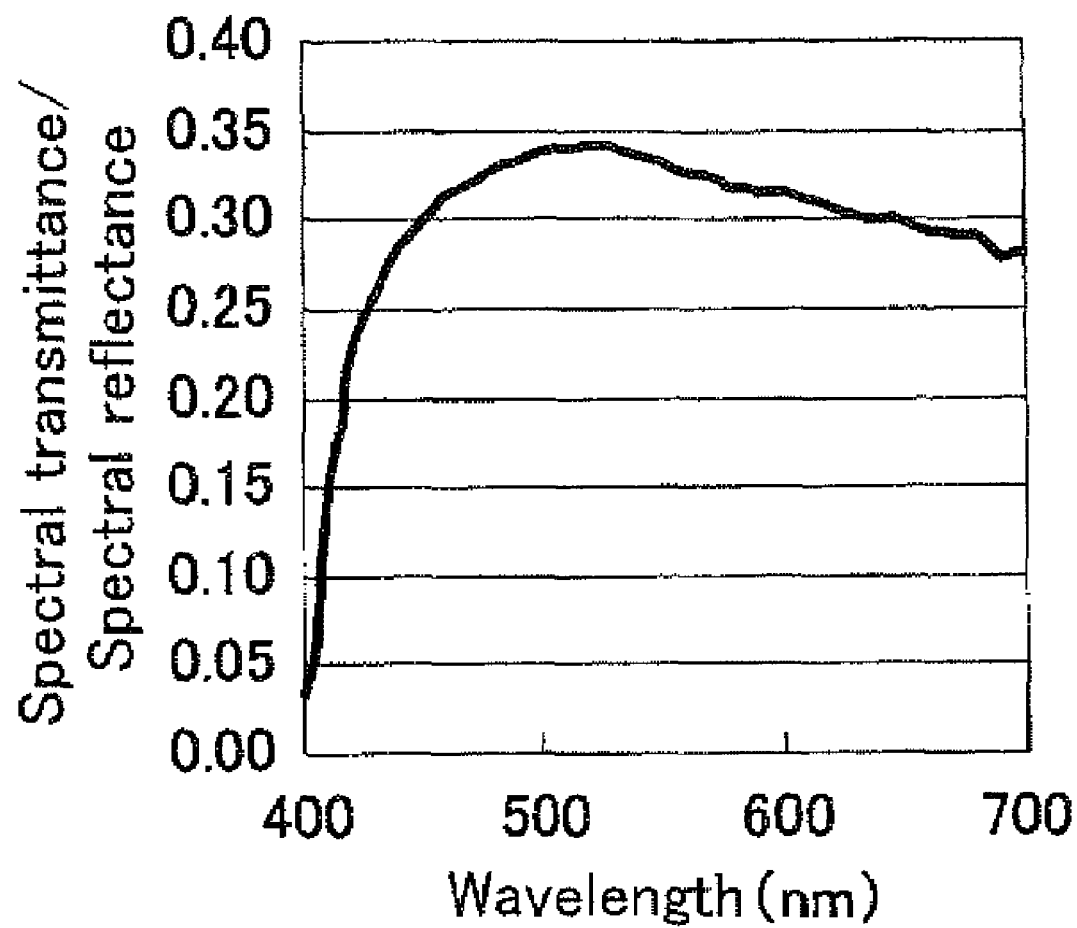

FIG. 4 is a graph showing measurement results of the spectral transmittance and the spectral reflectance of the liquid crystal layer 13.

Figure 5:
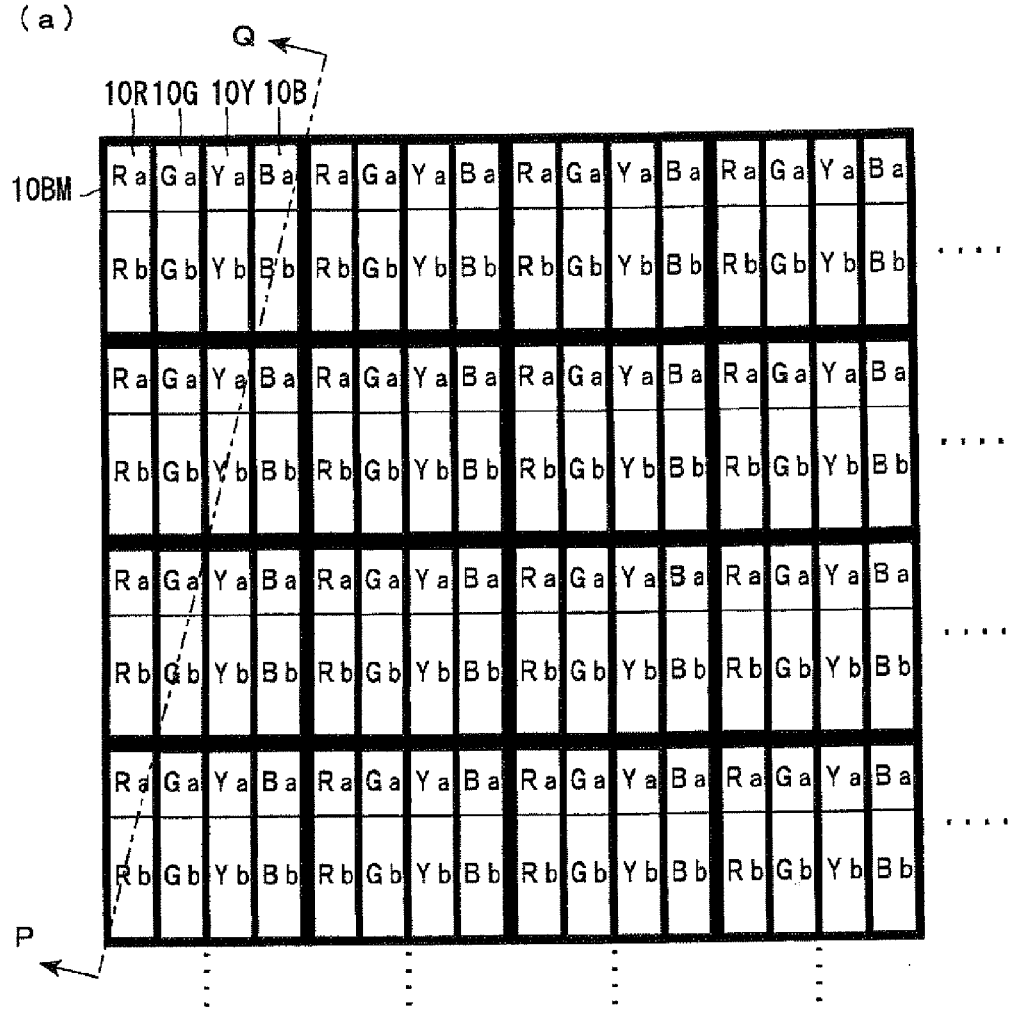
Figure 5:
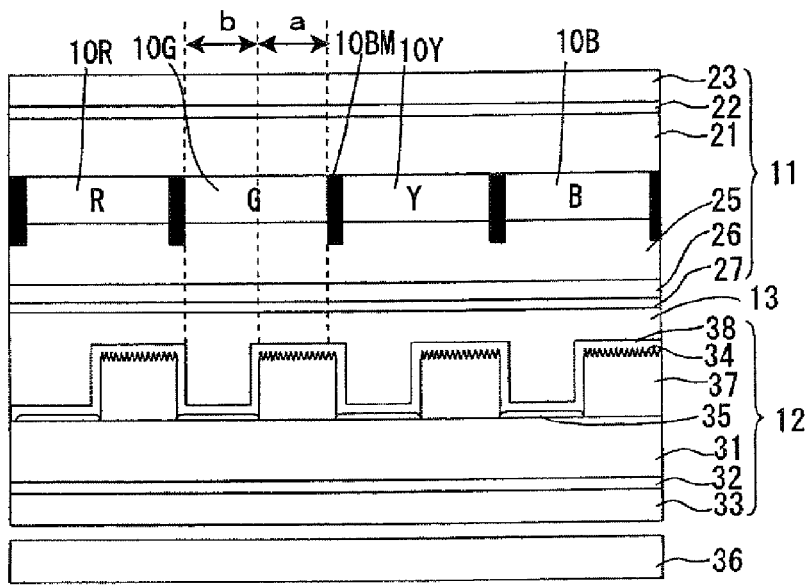

FIG. 5(a) is a planar view schematically showing a configuration of pixels in the transflective display device in accordance with Comparative Embodiment 1. FIG. 5(b) is a schematic view showing a cross-section taken along line P-Q in FIG. 5(a).

Figure 6:
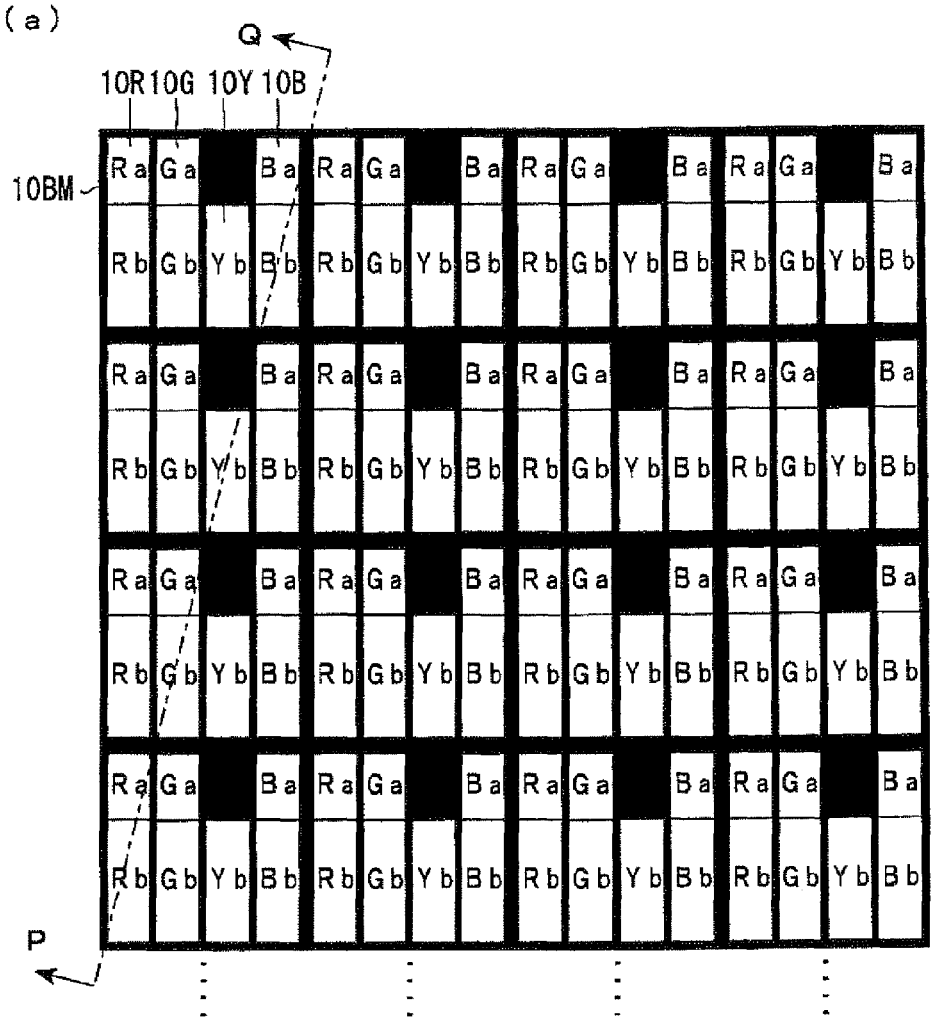
Figure 6:
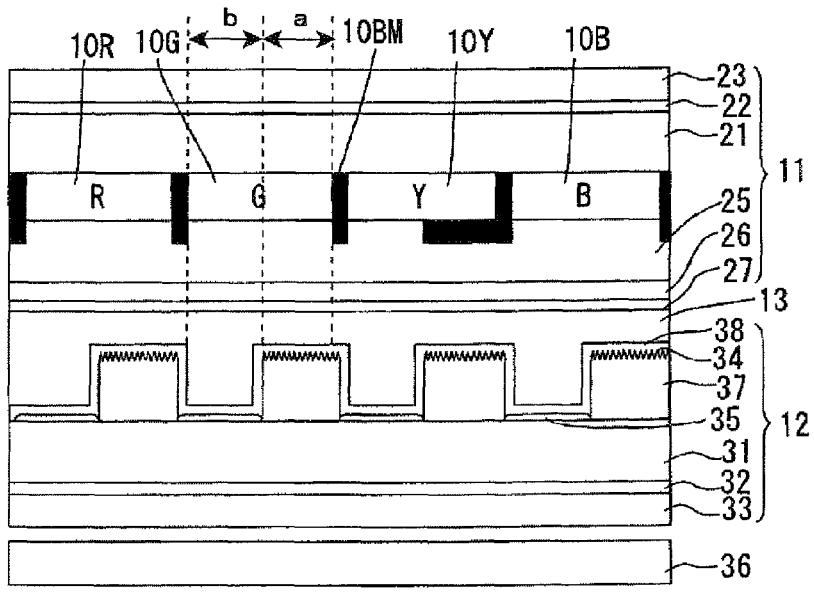

FIG. 6(a) is a planar view schematically showing a configuration of pixels in the transflective display device in accordance with Reference Embodiment 1. FIG. 6(b) is a schematic view showing a cross-section taken along line P-Q in FIG. 6(a).

Figure 7:
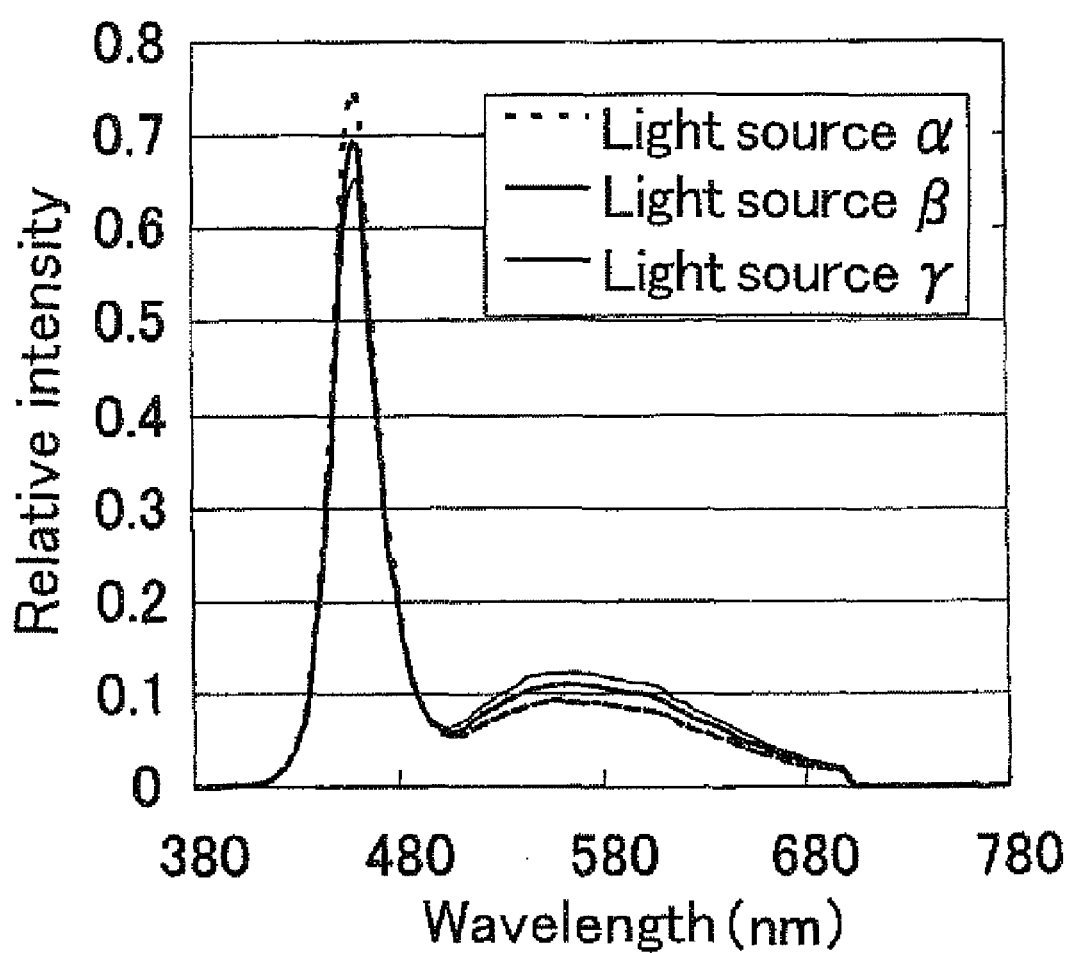

FIG. 7 is a graph showing light emission spectrums of light sources α to γ in the back light 36.

FIG. 8(a) is a planar view schematically showing a configuration of pixels in the transflective display devices in Embodiments 2 to 10, Comparative Embodiments 2 and 3, and Reference Embodiments 2 to 4. FIG. 8(b) is a schematic view showing a cross-section taken along line P-Q in FIG. 8(a).

Figure 8:
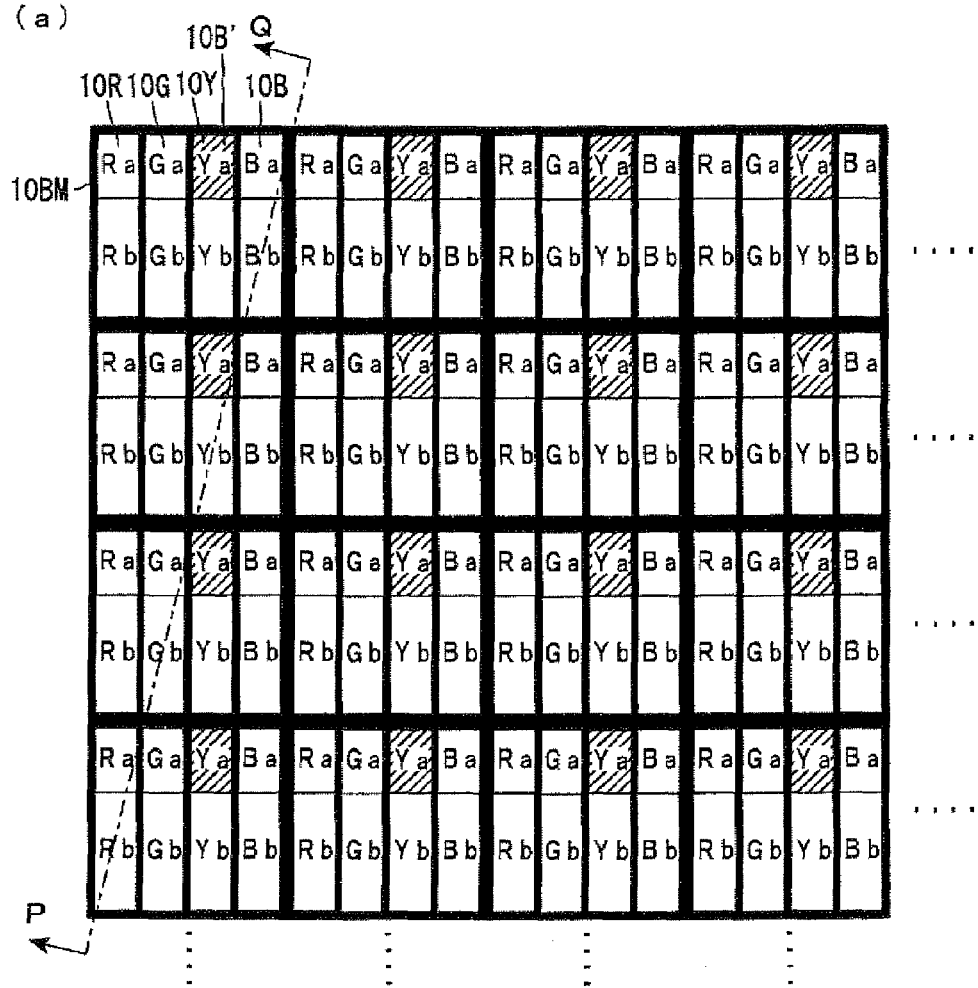
Figure 8:
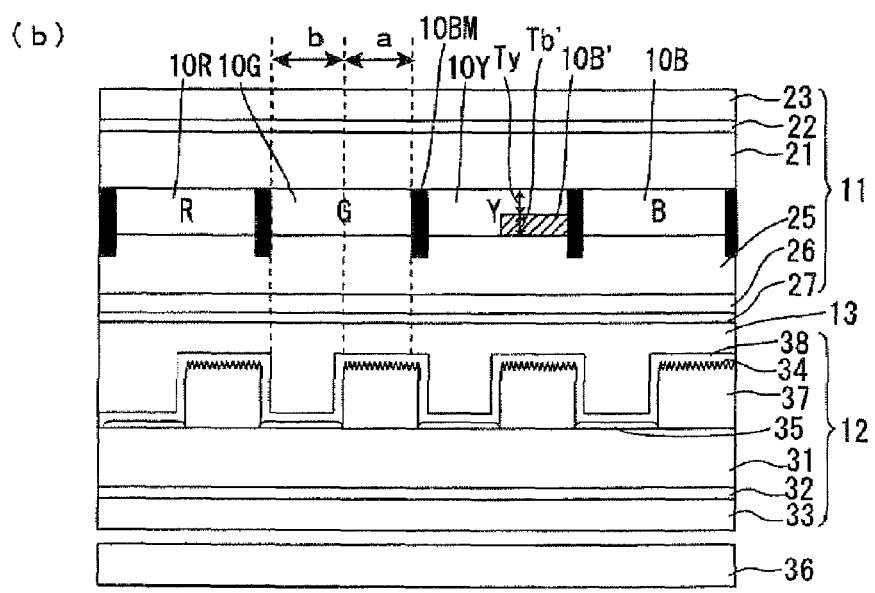
Figure 9:
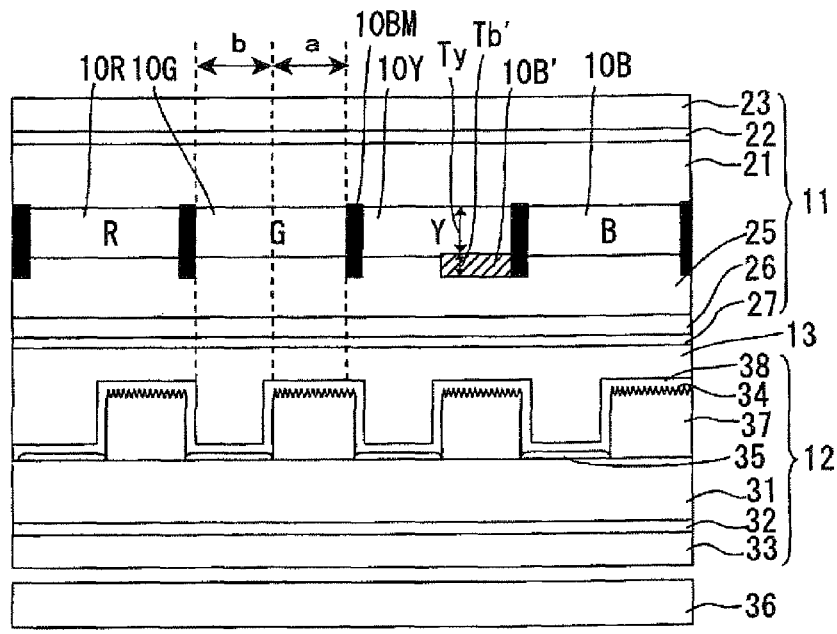

FIG. 9 is a cross-sectional view schematically showing a modified embodiment of the transflective display device shown in FIG. 8.

Figure 10:
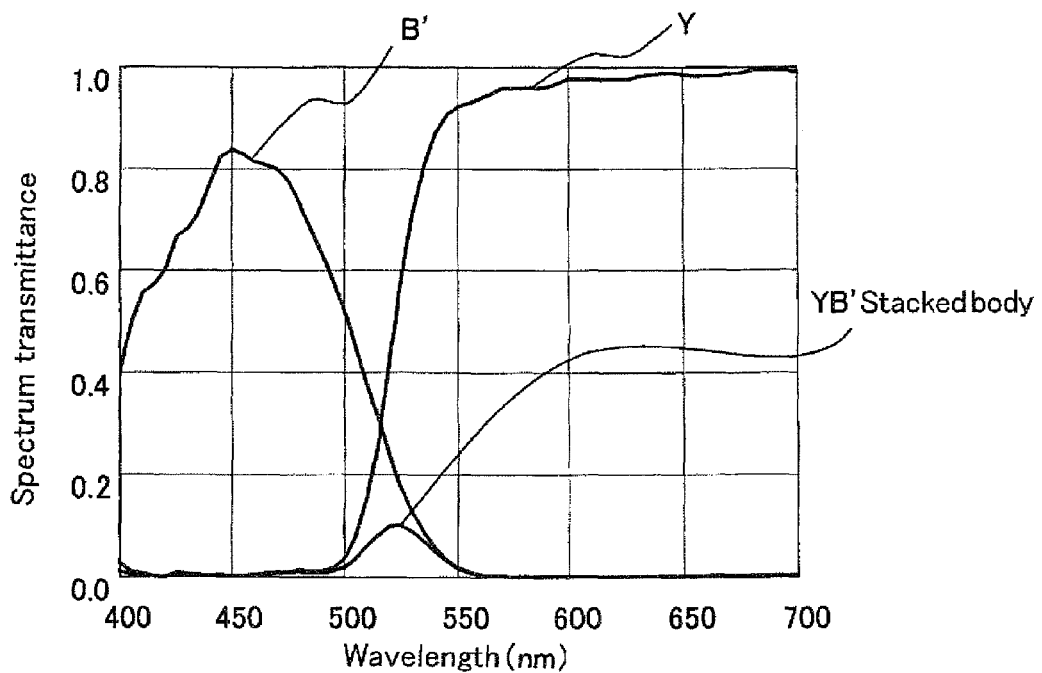

FIG. 10 is a graph showing spectral characteristics of a yellow filter, a blue resin film, and a stacked body consisting of the yellow filter and the blue resin film, when each of the yellow filter and the blue resin film has a thickness of 1.8 μm.

Figure 11:
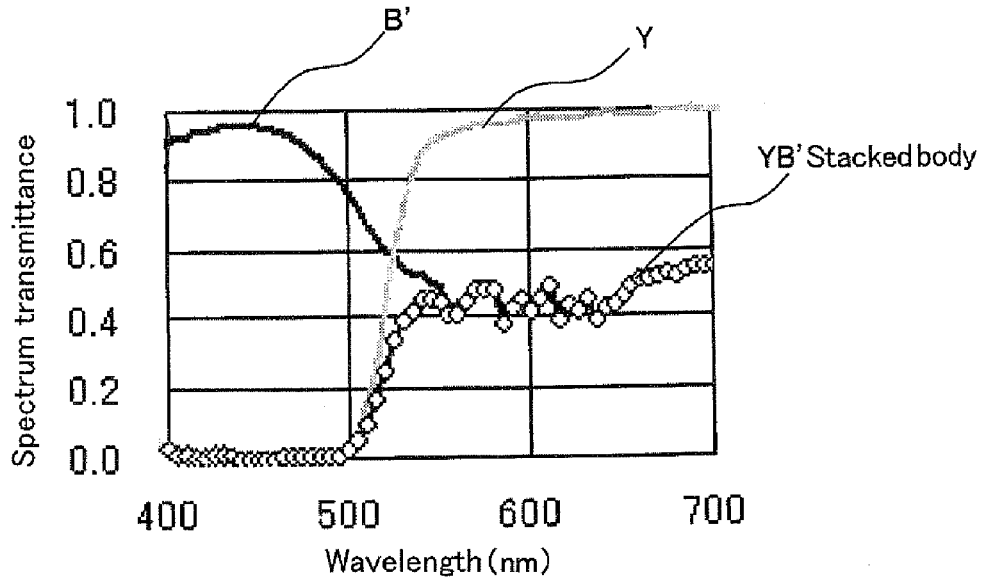

FIG. 11 is a graph showing spectral characteristics of a yellow filter, a blue resin film, and a stacked body consisting of the yellow filter and the blue resin film, when the yellow filter has a thickness of 1.8 μm and the blue resin film has a thickness of 0.3 μm.

Figure 12:
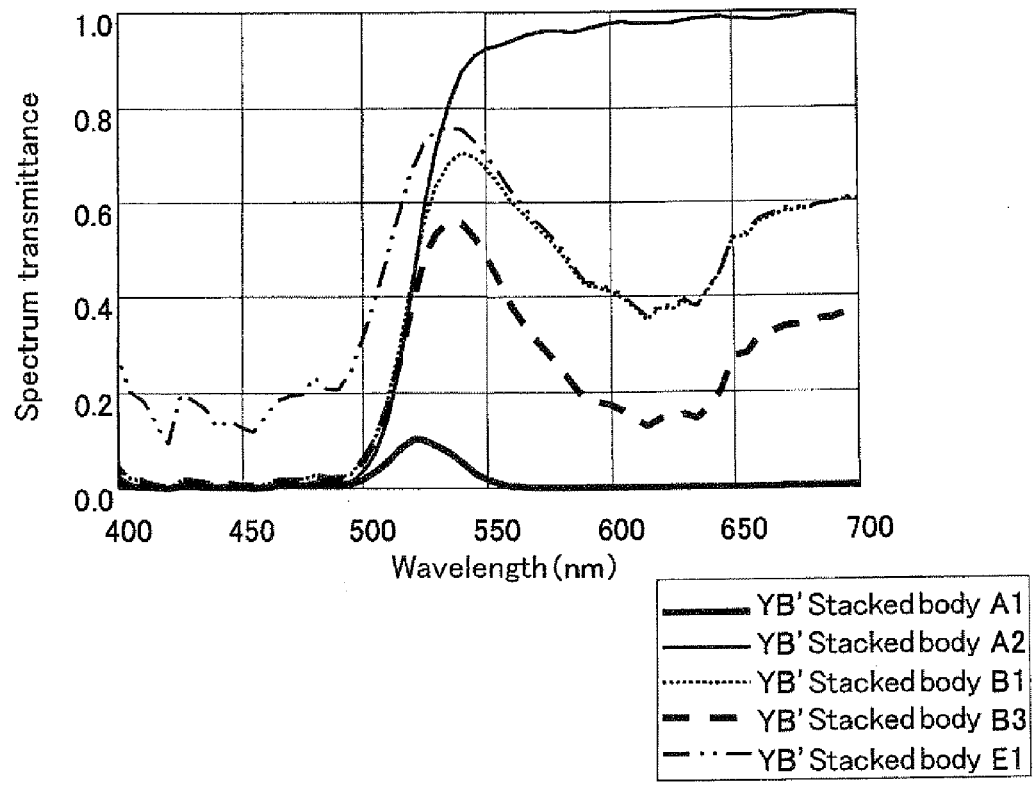

FIG. 12 is a graph showing spectral characteristics of the YB' stacked bodies A1, A2, B1, B2, and E1 in Table 2.

Figure 13:
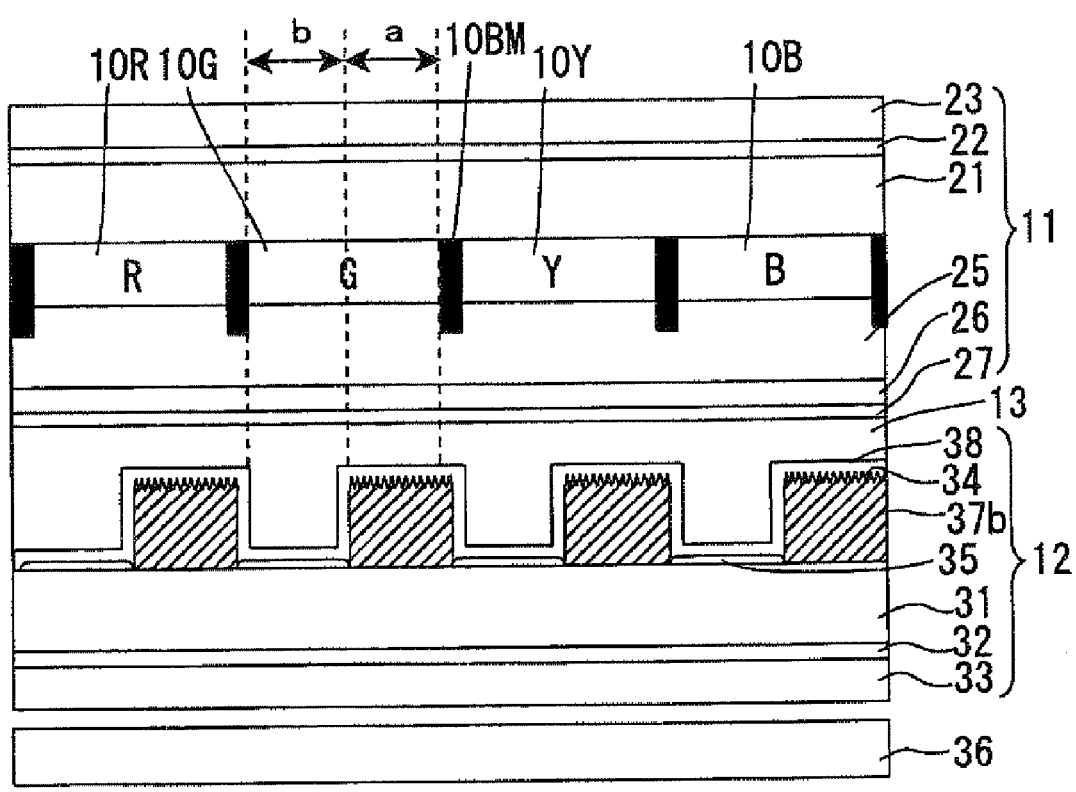

FIG. 13 is a schematic view showing one example of the cross-sectional configuration of the pixels in the display device of the present invention.

EXPLANATION OF NUMERALS AND SYMBOLS

10R: Red filter
10G: Green filter
10B: Blue filter
10Y: Yellow filter
10BM: Black matrix
10Gy: Gray resin film
10B': Blue resin film
11: Counter substrate
12: Pixel substrate
13: Liquid crystal layer
21: Glass substrate
22: Retarder
23: Polarizer
25: Overcoat layer
26: Counter electrode
27: Alignment film
31: Glass substrate
32: Retarder
33: Polarizer
34: Reflective electrode
35: Transparent electrode
36: Backlight
37: Projection (multi-gap layer)
37b: Bluish projection
38: Alignment film
a: Reflective region
b: Transmissive region
Ra: Reflective region of red filter
Rb: Transmissive region of red filter
Ga: Reflective region of green filter
Gb: Transmissive region of green filter
Ba: Reflective region of blue filter
Bb: Transmissive region of blue filter
Ya: Reflective region of yellow filter
Yb: Transmissive region of yellow filter
Ty: Thickness of yellow filter
Tb': Thickness of blue resin film

The invention claimed is:

1. A transflective display device comprising:
three or more color filters having different colors in a pixel,
each of the three or more color filters in the pixel having different colors so that each of the three or more color filters in the pixel has a different color, and including: a transmissive region for displaying an image by transmitting light from a backlight; and a reflective region for displaying an image by reflecting ambient light,
wherein, in the reflective region of at least one of the three or more color filters for displaying white in reflective display, a light-reducing film which reduces an amount of at least light having a peak wavelength of a visible light transmission spectrum of the at least one of the three or more color filters is arranged, and the visible light transmission spectrum is measured using a standard light source $D_{65}$; and
wherein the light-reducing film is a gray film.

2. The transflective display device according to claim 1,
wherein the light-reducing film has a hue different from a hue of the filter on which the light-reducing film is arranged, and
the display device emits light having the same hue as the hue of the filter on which the light-reducing film is arranged from the reflective region of the filter on which the light-reducing film is arranged when the display device displays white in the reflective display using the standard light source $D_{65}$.

3. The transflective display device according to claim 1, wherein a red filter, a green filter, a blue filter, and a yellow filter are arranged in the pixel.

4. The transflective display device according to claim 3, wherein the light-reducing film is arranged in the reflective region of the yellow filter.

5. The transflective display device according to claim 4, wherein the display device emits yellow light from the reflective region of the yellow filter on which the light-reducing film is arranged when the display device displays white in the reflective display using the standard light source $D_{65}$.

6. The transflective display device according to claim 4, wherein the light-reducing film is a blue film.

7. The transflective display device according to claim 6, wherein the blue film includes a material for the blue filter.

8. The transflective display device according to claim 6, wherein the display device is a liquid crystal display device, and the blue film makes a thickness of a liquid crystal layer in the reflective region of the yellow filter smaller than a thickness of the liquid crystal layer in the transmissive region of the yellow filter.

9. The transflective display device according to claim 1, wherein the light-reducing film is arranged in the reflective region of each of the three or more filters having different colors.

10. The transflective display device according to claim 9, wherein the display device is a liquid crystal display device, and the light-reducing film makes a thickness of a liquid crystal layer in the reflective region smaller than a thickness of the liquid crystal layer in the transmissive region.

11. The transflective display device according to claim 9, wherein a red filter, a green filter, a blue filter, and a yellow filter are arranged in the pixel, and the light-reducing film is a bluish film.

12. The transflective display device according to claim 1, wherein the display device is a liquid crystal display device.

13. The transflective display device of claim 1, wherein the light-reducing film is provided substantially on only one of the three or more color filters in the pixel.

14. The transflective display device of claim 1, wherein the three or more color filters includes a red filter, a green filter, a blue filter, and a yellow filter, and wherein the light-reducing film is provided in the reflective region of the yellow filter.

15. The transflective display device of claim 1, wherein a total thickness of the light-reducing film and the filter on which the light-reducing film is arranged is substantially the same as a thickness of another filter.

16. A transflective display device comprising three or more filters having different colors in a pixel,
   each of the three or more filters having different colors, including: a transmissive region for displaying an image by transmitting light from a backlight; and a reflective region for displaying an image by reflecting surrounding light,
   wherein, in the reflective region of at least one of a plurality of filters having different colors used for displaying white in reflective display,
   a light-reducing film which reduces an amount of at least light having a peak wavelength of a visible light transmission spectrum of the at least one of a plurality of filters is arranged,
   the visible light transmission spectrum is measured using a standard light source $D_{65}$; and
   wherein a total thickness of the light-reducing film and the filter on which the light-reducing film is arranged is substantially the same as a thickness of another filter.

17. The transflective display device according to claim 16, wherein the light-reducing film is a gray film.

18. The transflective display device of claim 16, wherein the light-reducing film is provided substantially on only one of the three or more color filters in the pixel.

* * * * *